United States Patent [19]
Williams

[11] Patent Number: 5,711,267
[45] Date of Patent: Jan. 27, 1998

[54] INTERNAL COMBUSTION ENGINE WITH OPTIMUM TORQUE OUTPUT

[76] Inventor: Kenneth A. Williams, 506 N. Greenwood Ave., Clearwater, Fla. 34615

[21] Appl. No.: 743,003

[22] Filed: Nov. 1, 1996

[51] Int. Cl.$^6$ ............................................. F02B 75/04
[52] U.S. Cl. .................................. 123/197.4; 74/579 E
[58] Field of Search ........................... 123/197.1, 197.4; 74/579 E

[56] References Cited

U.S. PATENT DOCUMENTS

| | | |
|---|---|---|
| 879,289 | 2/1908 | Mayo et al. |
| 1,209,708 | 12/1916 | Houlehan . |
| 1,728,363 | 9/1929 | Rightenour . |
| 1,748,443 | 2/1930 | Dawson . |
| 1,783,589 | 12/1930 | Shepard . |
| 1,978,058 | 10/1934 | Peterson . |
| 2,006,498 | 7/1935 | Dasset . |
| 2,151,853 | 3/1939 | Jonville et al. . |
| 2,340,010 | 1/1944 | Miller . |
| 2,528,386 | 10/1950 | Napper . |
| 3,687,117 | 8/1972 | Panariti ............................ 123/43 A |
| 3,895,614 | 7/1975 | Bailey ............................. 123/74 R |
| 4,044,629 | 8/1977 | Clarke ........................... 123/78 BA |
| 4,152,955 | 5/1979 | McWhorter ..................... 74/602 |
| 4,211,190 | 7/1980 | Indech ............................ 123/48 B |
| 4,437,438 | 3/1984 | Mederer ......................... 123/78 E |
| 4,466,403 | 8/1984 | Mentor ............................ 74/602 |
| 4,467,756 | 8/1984 | McWhorter ..................... 74/595 |
| 4,712,518 | 12/1987 | Johnson .......................... 123/48 B |
| 4,777,845 | 10/1988 | Miller ............................. 123/197.4 |
| 4,803,964 | 2/1989 | Kurek et al. ..................... 74/30 |
| 4,966,043 | 10/1990 | Frey ................................ 74/52 |
| 5,060,603 | 10/1991 | Williams ......................... 123/58 A |
| 5,215,045 | 6/1993 | Vadnjal ........................... 123/58 A |
| 5,239,958 | 8/1993 | Booher ............................ 123/197.2 |
| 5,297,448 | 3/1994 | Galvin ............................ 74/55 |
| 5,394,839 | 3/1995 | Haneda ........................... 123/197.4 |

*Primary Examiner*—David A. Okonsky
*Attorney, Agent, or Firm*—Sixbey, Friedman, Leedom & Ferguson; Stuart J. Friedman

[57] ABSTRACT

An improved engine output shaft includes a crankpin assembly for operatively connecting the shaft to each reciprocating piston for translating the reciprocating motion of each piston to rotary motion of the shaft through a leverage arm between the axis of rotation of the shaft and the point of operative connection between each piston and the shaft. The crankpin assembly is fixed to rotate with the shaft and defines a plurality of fixed crankpin offsets and transition offsets which sequentially vary the moment arm in a predetermined manner during the rotation of the shaft to produce a substantially constant total engine torque output during each increment of rotational movement. A method for making the improved engine output shaft comprises the steps of providing aforedescribed crankpin assembly, determining a target value for total torque output for each increment of engine output rotation, selecting first estimated values for each of the plurality of fixed crankpin and transition offsets, calculating the engine output torque for each rotational increment for a single cylinder, summing the torque contributions and demands for all cylinders at each increment of shaft rotation to determine the total torque output for each increment, comparing the total torque output with the target value for each increment, selecting second estimated values for each of the plurality of fixed crankpin and transition offsets based upon the observed deviation from the target torque value and repeating the calculations until the selected offsets satisfactorily reproduce the target torque value.

31 Claims, 14 Drawing Sheets

FIG. 1A

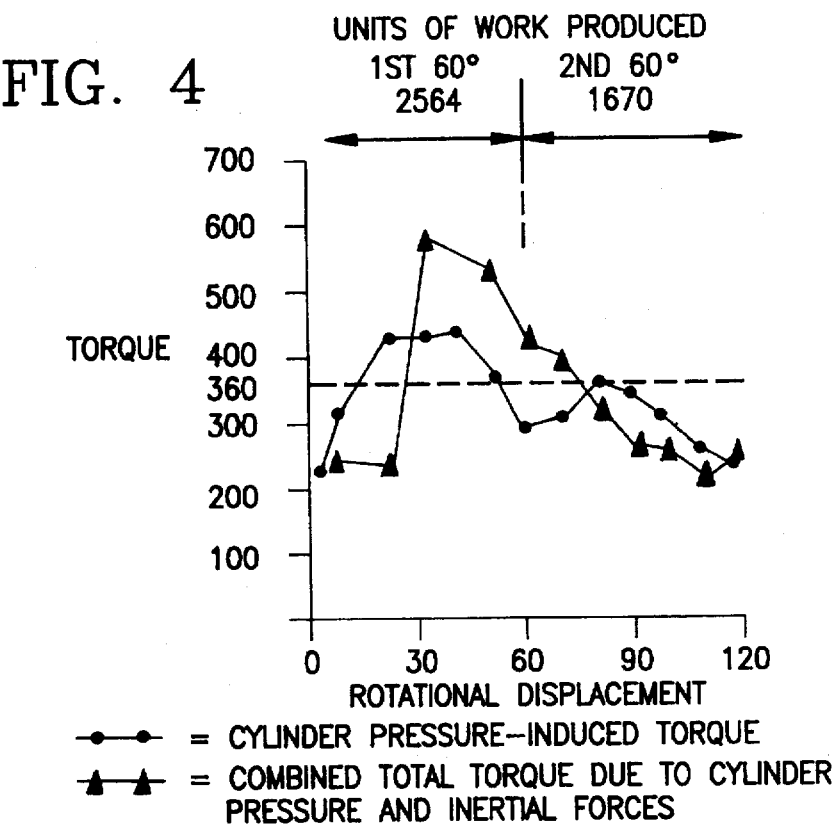
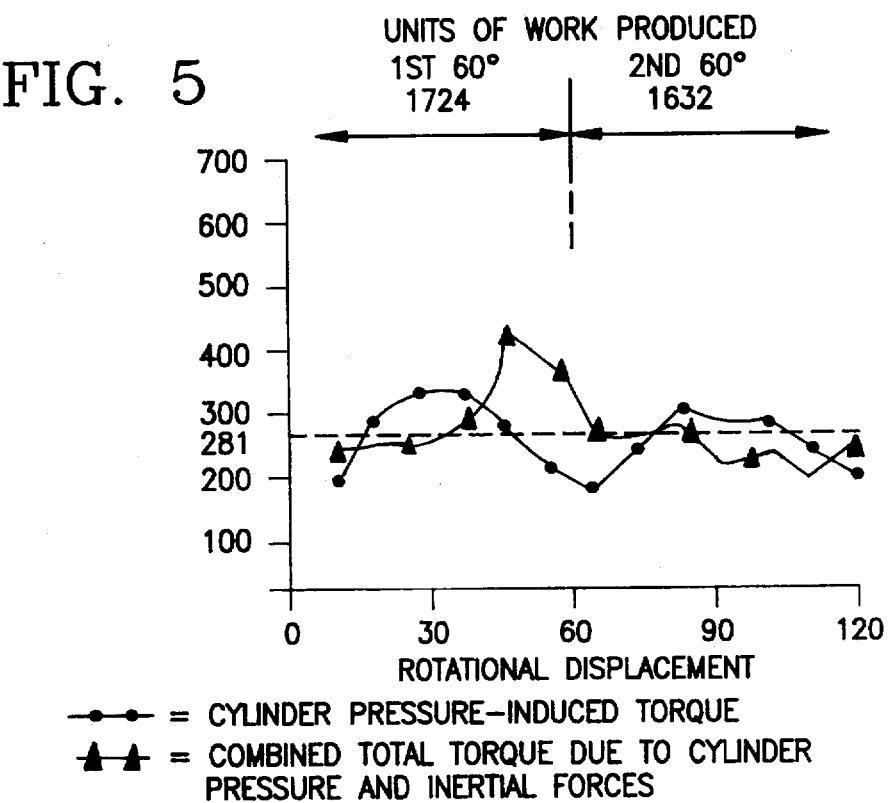

INTERNAL COMBUSTION ENGINE WITH OPTIMUM TORQUE OUTPUT

TECHNICAL FIELD

This invention relates to internal combustion engines and the manner of translating reciprocal motion into rotary motion with improved efficiency. More specifically, this invention is directed to an improved crankpin that provides a substantially constant total torque at all crankpin displacements so as to produce a substantially constant engine output.

BACKGROUND OF THE INVENTION

Internal combustion engine design has been subject to constant modifications and redesigns since its inception with the specific purpose of improving engine operating efficiency. Many improvements, however, that are directed toward improving engine efficiency are often not practical or are so costly that no real savings can be appreciated.

One particular line of internal combustion engine modifications for increasing engine output efficiency involves the alteration of the traditional four-stroke cycle. A typical four-stroke engine cycle is defined as including an intake stroke, a compression stroke, a power stroke, and an exhaust stroke. For its operation, at least one reciprocating piston is moved within a cylinder bore from a top dead center position (hereinafter abbreviated TDC) to a bottom dead center position (hereinafter abbreviated BDC), with four strokes occurring over two revolutions of the engine output shaft. Typically, in a first revolution, the piston will move inwardly from the TDC to BDC positions, defining the intake stroke during which an intake valve is opened so that an air/fuel mixture is suctioned into the engine cylinder above the piston. Thereafter, a compression stroke takes place as the piston moves outwardly so as to reduce the volume of the air/fuel mixture and increase the pressure within the engine cylinder prior to combustion of the explosive mixture. Normally, just before the beginning of the second revolution, the air fuel mixture is ignited at a point near the TDC position after which the power expansion stroke results causing the inward travel of the piston. Thereafter, the exhaust stroke occurs while the piston moves outwardly, as a result of which the exhaust gases are pumped through an exhaust valve that is opened in synchronization to the engine output shaft.

A conventional internal combustion engine includes a connecting rod pivotally connected via a wrist pin at one end to the piston and at another end to an offset portion of the output shaft for translating the reciprocal piston motion to the output shaft. The offset portion is spaced from the axis of rotation of the output shaft. The degree of offset defines the amount of leverage or the magnitude of the force moment acting on the output shaft since the leverage or moment is a function of the applied force as well as the distance between the applied force and the axis of rotation. During the power expansion stroke of the four-stroke cycle, chemical energy from the combustion of the air/fuel mixture is converted to linear motion of the piston caused by the expansion of the combusted gases. This energy is utilized to turn the engine output shaft and is released within each cylinder once during each two revolutions of the engine output shaft. Thus, it can be seen that the provision of multiple engine cylinders increases the number of times that an engine output shaft is powerfully driven during each revolution.

This conversion of chemical energy to transitional work of the piston is of course another area in which gains in efficiency have been advanced. Moreover, in modern engines, advances have also been made regarding the preparation of the air/fuel mixture by way of improved carburetors, fuel injection systems, and super-chargers.

However, even in light of the recent developments regarding fuel conversion to energy and fuel consumption efficiency, modern engines still run inefficiently with regard to the ability of the engine to actually convert the energy released by combustion into actual work output from the engine. To improve this, it is necessary to improve the manner in which the potential work available from the reciprocating piston is translated to the engine output shaft or output shaft.

When considering the forces that coact within the engine cylinder between the piston and the output shaft during the power expansion stroke, it will be appreciated that the pressure/force magnitude constantly decreases. The leverage arm, defined as the distance between the point of connection of the connecting rod to the output shaft and the axis of rotation of the output shaft, increases as the piston moves from the TDC position to a position approximately 90 degrees after TDC, after which it decreases. Neither the force applied to the piston from combustion nor the leverage arm decrease or increase linearly.

Since work is dependent on the product of distance times the force applied thereto, the reciprocating movement of the piston as driven during the power stroke becomes the potential work that is available to drive the output shaft. Thus, the ability and goal of an engine to most efficiently make use of the chemical energy provided from combustion is to find a way to more efficiently transfer the potential work from the reciprocating piston to the rotating output shaft.

There are many known methods and work paths to permit the piston to travel from TDC to BDC and transfer a portion of its available potential work to a rotary member or shaft. These include a conventional output shaft, a camdisk, a camdrum, and a gear chain. The common failure in each of these approaches is their inability to provide a consistent force magnitude to the rotating output shaft throughout the entire rotational arc through which an individual piston stroke acts. Rather, what these known engines have done is to deliver an erratic and inconsistent force to the rotating output shaft while applying some random magnitude of force during the rotational arc throughout which each individual piston acts. An example is shown in U.S. Pat. No. 2,006,498 to Dassett, that utilizes a noncircular cam-type output shaft for transferring the work from the piston. Although this patent does inherently provide a cam profile that modifies the leverage arm acting on the output shaft, it does not attempt to provide a consistent force magnitude to the engine output shaft throughout the entire rotational arc through which an individual piston stroke acts. More specifically, the device includes a cam profile which, at the start of the downward stroke of the piston during expansion, produces a rapid displacement of the piston to thereby permit a quick expansion stroke for greater mechanical efficiency and less heat production. However, because the patent does not realize that it is important to provide a consistent torque throughout the power stroke, the Dassett device falls far short of the extent to which the leverage arm can be modified.

Other types of prior art devices that modify the piston strokes of a four cycle internal combustion engine are disclosed in U.S. Pat. No. 4,467,756 to McWhorter and U.S.

Pat. No. 4,466,403 to Menton. These devices include a means to modify the crank offset or leverage arm during the course of engine operation. Specifically, the crank arm is effectively lengthened before the power expansion stroke for providing an increased leverage to produce greater torque by increasing the mechanical advantage during the power stroke. Although these devices increase engine output torque and may improve engine efficiency to at least some degree, they do not modify the crank offset during the power stroke nor do they attempt to provide a consistent force magnitude.

Many other types of cam-driven output shaft internal combustion engines are known in the prior art including those with specifically designed cam paths that are altered to provide variable stroke mechanisms. That is to say, certain of the strokes of the typical four-cycle are modified to change the length of stroke and/or timing. An example is shown in U.S. Pat. No. 1,728,363 to Rightenour, which discloses a double cam device for providing two reciprocating piston motions during a single output shaft rotation, wherein the cam profiles are modified specifically for varying piston speed during certain stroke instances and defining different stroke lengths depending on the stroke. Moreover, Rightenour recognizes that using a rapid movement cam profile during the firing stroke provides a modified leverage at a specific point. Again, however, the cam path is not tailored for maximizing engine operating efficiency in the translation of reciprocal motion to rotary motion.

The devices disclosed in the following U.S. Pat. No. 3,895,614 to Bailey, U.S. Pat. No. 3,687,117 to Panariti, U.S. Pat. No. 1,209,708 to Houlehan, U.S. Pat. No. 879,289 to Mayo et al., U.S. Pat. No. 1,748,443 to Dawson, and U.S. Pat. No. 2,528,386 to Napper are of interest for their disclosure of engine output cam shafts which include guide tracks defined on a disc-like member associated with the output shaft and where the piston includes a roller or pin-type mechanism that is guided within the guide tracks. The guide tracks are used to translate the reciprocating motion of the piston into rotary motion of the output shaft. These patents disclose various guide paths for translating the reciprocating to rotary motion; however, they do not attempt to increase the output efficiency by providing a consistent torque magnitude to the output shaft.

U.S. Pat. No. 5,060,603 to Williams discloses a device for increasing an internal combustion engine's output efficiency by improving the efficiency of energy conversion from a reciprocating piston motion to rotary output shaft motion. Specifically, it accomplishes this by providing at last one disc-like element rotatably fixed to the engine output shaft, the disc-like element having a work receiving guide groove defined therein which engages with a lower end of a connecting rod pivotally extending from the reciprocating piston. The work receiving guide groove increases the length of the leverage arm while the pressure force acting on the reciprocating piston decreases to provide a substantially constant torque during the expansion stroke. However, the work receiving guide groove is designed by taking into account only a single cylinder and ignoring the contributions and parasitic effects of the other cylinders. As a result, because it does not account for the erratic demands of the parasitic cylinders, the work receiving guide groove provides an erratic torque output rather than the desired uniform torque output.

It is clear from the above that many attempts have been made to improve engine operating efficiency with respect to the manner of translation of reciprocating motion of a piston to the rotary motion of a crank or cam-type output shaft including the use of additional leverage providing mechanisms or cam profiles affecting piston speed. However, none of these prior art references have contemplated that it is necessary to provide a consistent total force magnitude from all cylinders, including the parasitic effects of cylinders which are not in their power stroke, to the engine output shaft.

SUMMARY OF THE INVENTION

It is thus a primary object of the present invention to overcome the above noted inefficiencies, shortcomings and deficiencies of the prior art mechanisms.

It is a further object of the present invention to provide an engine output shaft design that provides a consistent force magnitude to a rotatable engine output shaft by controlling the point of application of the force from the reciprocating piston to the output shaft.

It is another objective of the present invention to provide a means for regulating and metering the torque magnitude imparted to the output shaft to approximately the same net torque level for all rotational increments.

It is another object of the present invention to provide a mechanism for translating reciprocating motion to rotary motion on a cyclic basis in combination with an internal combustion engine, wherein the internal combustion engine includes at least one reciprocating piston slidably provided within a cylinder, a control means for synchronously supplying a combustible gas mixture to the cylinder and igniting the mixture to drive the piston inwardly during the power expansion stroke of the piston cycle, and a rotatably mounted engine output shaft which is operatively connected to the reciprocating piston by a connecting means that translates the reciprocal motion to rotary motion. The engine output shaft includes a work receiving element that changes the position of connection of the connecting means between the engine output shaft and the piston for each cylinder so as, consistent with the contributions and demands of the other cylinders, to increase or decrease the distance between the axis of rotation and the connection to the engine output shaft as the piston force decreases or increases.

It is yet another object of the present invention to provide a substantially uniform net torque output of the engine output shaft throughout the engine cycle by providing a crankpin assembly that continually changes the effective moment arm.

It is still yet another object to provide an engine output shaft with an element having a torque guide path designed in accordance with the present invention to provide a substantially uniform work output from the engine output shaft even though the engine output shaft is driven by intermittent pulses of energy from the reciprocating pistons and the piston itself is provided with a force/pressure that decreases in magnitude during the power expansion stroke.

It is yet another object of the present invention to provide a method for making an engine output shaft for use in an internal combustion engine in combination with a reciprocating piston so as to convert reciprocating motion into rotary motion while providing a substantially constant torque output.

It is still another object to provide a method for making an engine output shaft for use in an internal combustion engine including the step of designing a crankpin means fixed to rotate with the engine output shaft for determining the point of application of the force from the reciprocating piston to the engine output shaft and controlling the degree of angular rotation of the engine output shaft during the increments of the power stroke. This is achieved by determining for a crankpin assembly having at least two fixed crankpin offsets, those offset values which result in total torque on the crankshaft for uniform increments of crankshaft rotational displacement most nearly approximating a predetermined mean torque value for all increments.

The above noted objects of the present invention and others not specifically referred to, but readily apparent to those skilled in the art, may be accomplished by providing an internal combustion engine including at least one piston reciprocally mounted within an internal combustion engine cylinder, a synchronous control means which supplies and controls the ignition of combustible gas to the cylinder for causing the power expansion stroke of the piston cycle, and an engine output shaft rotatably mounted within the internal combustion engine having means for converting reciprocating piston motion to rotary output shaft motion while providing a substantially constant torque output from the engine output shaft. More specifically, the engine output shaft includes a variable offset crankpin/connecting rod connection for achieving a relatively consistent torque magnitude throughout rotation of the crankshaft. The variable offset connection varies the crankpin offset during the rotation of the crankshaft, thus varying the moment arm in a predetermined manner to closely produce a predetermined ideal torque during each increment of rotational movement of the crankshaft.

In another aspect of the invention, the variable offset connection includes a connecting rod connected at one end to an engine piston and mounted via a cylindrical bearing surface for slidable movement at an opposite end to a crankpin assembly which is connected to the engine crankshaft. The crankpin assembly includes a crankpin, first and second transition rockers positioned on opposite sides of the crankpin in complementary shaped concavities to permit the rockers to pivot relative to the crankpin during rotation of the crankshaft. The rockers have inner semi-cylindrical surfaces having centers of curvature defining transition offset apexes. An outer surface of each rocker and first and second opposite bearing surfaces of the crankpin all have radii of curvature equal to the radius of curvature of the cylindrical connecting rod bearing surface to permit unobstructed, smooth sliding movement between connecting rod bearing surface and the crankpin and rocker surfaces as the crankshaft rotates. The crankpin has two fixed crankpin offset apexes, defined as $CPOA_{MIN}$ and $CPOA_{MAX}$, and defined by the distance between the longitudinal axis of the crankshaft and, respectively, the origin of the radius of curvature for each crankpin bearing surface. During rotation of the crankshaft, the crankpin offset apex will shift from $CPOA_{MIN}$ through TOA1 to $CPOA_{MAX}$ through TOA2 and back to $CPOA_{MIN}$ as the crankshaft moves through 360°. Thus, the moment arm is varied in a predetermined manner to more closely achieve a predetermined ideal torque during rotation of the crankshaft.

In still another aspect of the invention, the variable offset connection includes a modified crankpin assembly which includes a rotator bearing sleeve having an aperture formed therein for receiving a crankpin. The rotator bearing sleeve includes an uninterrupted, continuous outer bearing surface for sliding movement relative to cylindrical connecting rod bearing surface. The bearing sleeve further includes a rotator integral with the sleeve for slidably engaging a complementary shaped pivot surface on one side of the crankpin. On the other side of the crankpin, a transition roller assembly effectively permits the transition between the crankpin offsets without use of a rotator in the same plane as the integral rotator. This is accomplished by a transition roller pivotally mounted on a transverse support, the transition roller including a concavity shaped to receive a guide pin extending from the connecting rod into the guide groove at the beginning of the transition from the maximum crankpin offset to the minimum crankpin offset. As the crankshaft rotates, the transition roller engaging the guide pin also rotates to permit the guide pin to continue its movement through the guide groove. In this manner, as with the first embodiment of this invention, the moment arm can be optimally varied resulting in the desired substantially constant output torque without the practical problem of transitioning between the multiple bearing surfaces of the first embodiment.

In still another aspect of the present invention the shape and dimensions of the crankpin assembly can be determined by determining the crankpin and transition offset apexes which produce a variable offset and corresponding desired moment arms at specific displacement increments throughout rotation to create a substantially constant torque output. This is accomplished by an iterative calculation which involves determining an ideal mean torque as a target value for each displacement increment, selecting first estimated values of minimum and maximum crankpin offsets and transitional crankpin offsets, calculating the moment arms for each increment using the selected offsets, calculating the crankshaft torque for a single cylinder during at least its power and compression strokes at each increment using the calculated moment arm values, determining the torque contribution and/or parasitic effect on torque for each cylinder of the engine at each increment and summing to generate the total torque for each increment. The total torque values at each increment can then be individually compared to the ideal mean torque value and, based upon the observed deviations from the target torque value, adjustments can be made to the initially selected offset values and the calculation repeated until the selected offsets best reproduce the target mean torque value.

For a more complete understanding of the invention, reference is made to the following detailed description taken in conjunction with the accompanying drawings for which a preferred embodiment is described.

BRIEF DESCRIPTION OF THE DRAWINGS

FIG. 4 graphically compares the torque output of the engine crankshaft due to cylinder pressure only with the torque output due to both cylinder pressure and inertial effects during 120° of displacement for an engine having a variable offset crankpin in accordance with the present invention.

FIG. 5 graphically compares the torque output of the engine crankshaft due to cylinder pressure only with the torque output due to both cylinder pressure and inertial effects during 120° of displacement for an engine having a variable offset crankpin and a modified bore to stroke ratio in accordance with the present invention.

DETAILED DESCRIPTION OF THE PREFERRED EMBODIMENT

Figure 1A:
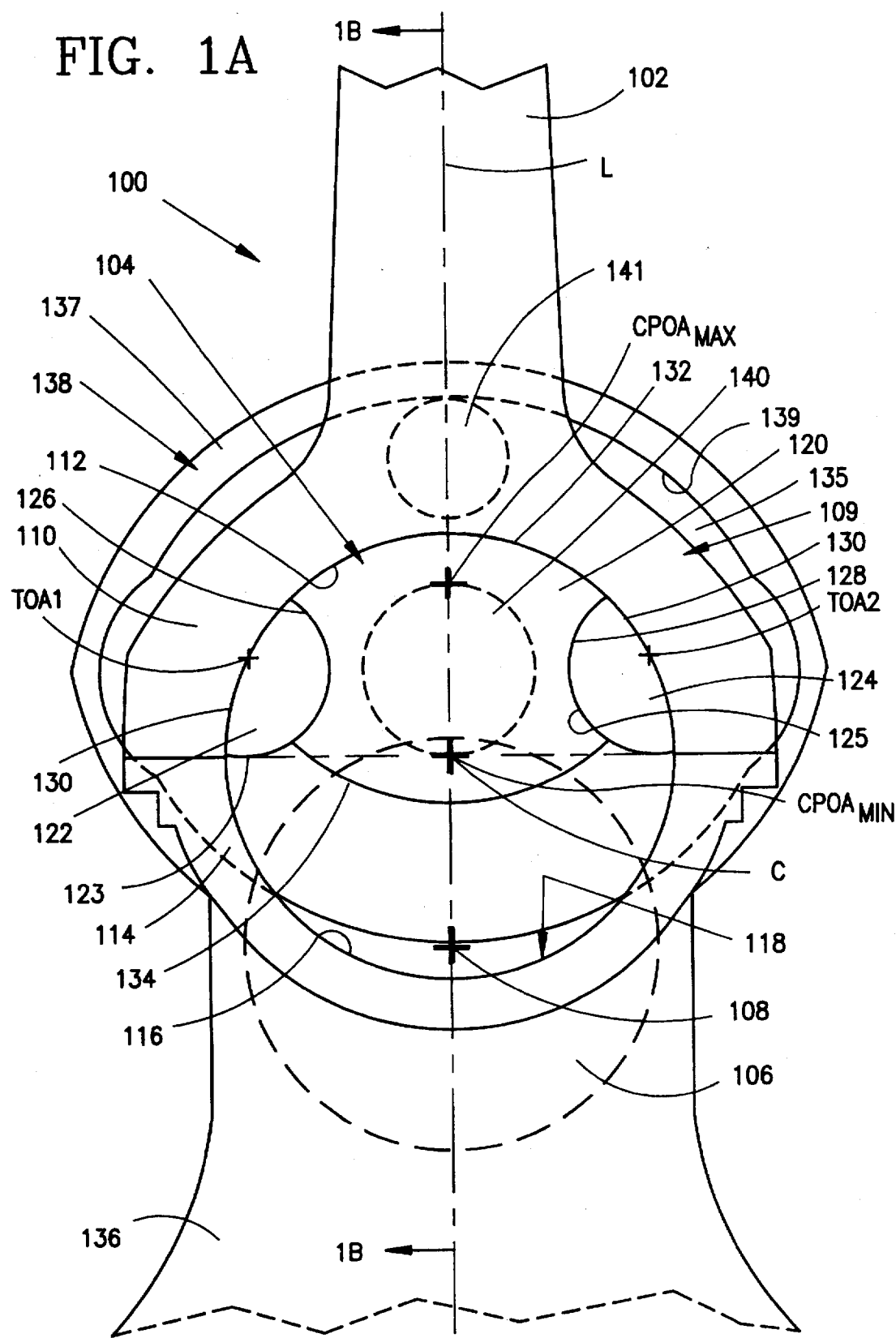
FIG. 1A is an end view of the variable offset crankshaft/connecting rod connection of the present invention with the connecting rod in its outermost position with the engine piston at top dead center.

Referring now to the figures, wherein like reference numerals designate like or corresponding parts throughout the figures, and in particular to FIGS. 1A–1J, there is shown one embodiment of the variable offset crankshaft/connecting rod connection of the present invention for achieving a relatively consistent torque magnitude throughout rotation of the crankshaft. The variable offset connection, indicated generally at 100, varies the crankpin offset during the rotation of the crankshaft, thus varying the moment arm in a predetermined manner to closely produce a predetermined ideal torque during each increment of rotational movement of the crankshaft. Variable offset connection 100 includes a connecting rod 102 connected at one end to an engine piston (not shown) and mounted for pivotal movement at an opposite end on a crankpin assembly 104. Crankpin assembly 104 is connected to a crankshaft, indicated at 106, extending along a longitudinal axis 108.

As in all conventional reciprocating piston type engines, the piston (not shown) reciprocates through a power stroke, an exhaust stroke, an intake stroke and a compression stroke during two rotations of crankshaft 106 in a typical four-stroke engine. In a two-stroke engine, each rotation of crankshaft 106 would result in a compression stroke followed by a power stroke. In either engine, the pressure forces resulting from combustion are transmitted through the piston and connecting rod 102 to crankshaft 106 via crankpin assembly 104. The torque transmitted to crankshaft 106 is a product of the force acting on the piston transmitted through connecting rod 102 and the moment arm, that is, the perpendicular distance between longitudinal axis 108 and the force component acting along the centerline of the connecting rod. Variable offset connection 100 effectively varies the moment arm by varying the offset of the crankpin from the axis 108 during rotation of crankshaft 106 to achieve a more consistent torque magnitude throughout rotation of crankshaft 106.

Figure 1C:
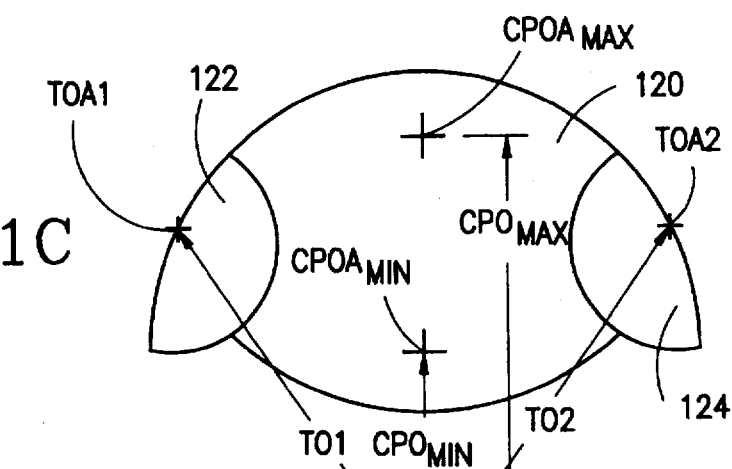
FIG. 1C is a schematic view of the crankpin assembly of the present invention showing the various variable offsets.
Figure 1B:
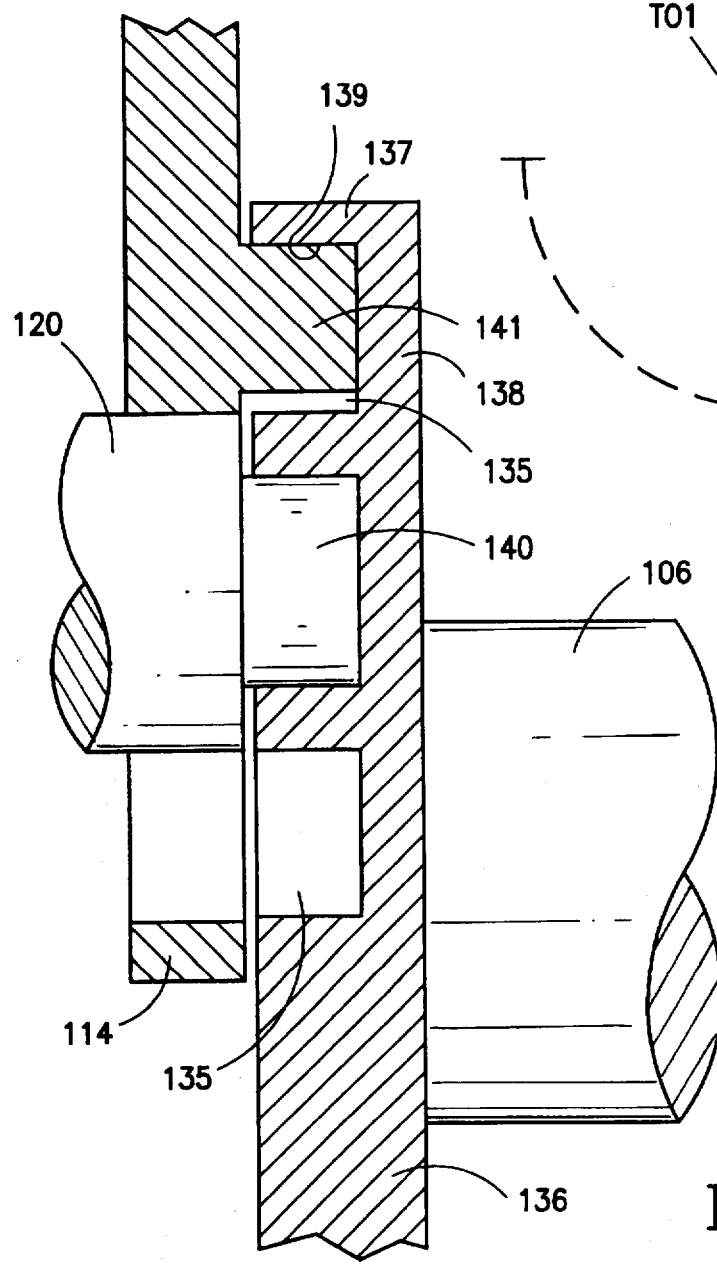
FIG. 1B is a partial sectional view of the variable offset crankshaft/connecting rod connection of the present invention taken along line 1B—1B in FIG. 1A.

Referring to FIGS. 1A and 1B, connecting rod 102 includes a crank end 109 including a first arcuate portion 110 having a semi-cylindrical bearing surface 112, and a second arcuate portion 114 also having a semi-cylindrical bearing surface 116. Second arcuate portion 114 is connected to first end portion 110 in a conventional manner so that first semi-cylindrical bearing surface 112 and second semi-cylindrical bearing surface 116 form a cylindrical connecting rod bearing surface 118 for abutment by crankpin assembly 104.

Crankpin assembly 104 includes a crankpin 120, a first transition rocker 122 positioned on one side of crankpin 120 and a second transition rocker 124 positioned on an opposite side of crankpin 120. First transition rocker 122 and second transition rocker 124 each include inner semi-cylindrical surfaces 123 and 125, respectively, having centers of curvature, hereinafter referred to as transition offset apexes 1 (TOA1) and 2 (TOA2), respectively, as shown in FIGS. 1A and 1C. Inner surface 123 is positioned in a complementary shaped first concavity 126 formed in the respective side of crankpin 120 to permit rocker 122 to pivot relative to crankpin 120 during rotation of crankshaft 106. Likewise, inner surface 125 of second transition rocker 124 is pivotally positioned in a second concavity 128 formed in the respective side of crankpin 120. An outer surface 130 of each transition rocker 122, 124 is formed with a radius of curvature equal to the radius of curvature of cylindrical connecting rod bearing surface 118. Likewise, crankpin 120 includes a first bearing surface 132 and a second bearing surface 134, positioned opposite first bearing surface 132, each having a radius of curvature equal to the radius of curvature of cylindrical connecting rod bearing surface 118. In this manner, crankpin 120 and first and second transition rockers 122, 124, respectively, are shaped to complementarily abut cylindrical bearing surface 118 to permit unobstructed, smooth sliding movement between connecting rod bearing surface 118 and surfaces 130, 132, 134.

As shown in FIG. 1B, crankshaft 106 includes a counterweight 136 extending transversely from one side of crankshaft 106 and a transverse support 138 integrally formed with counterweight 136 and extending from the opposite side of crankshaft 106. Crankpin 120 includes an axial end boss 140 for connection to crankshaft 106 via, for example, transverse support 138. Transverse support 138 includes a guide groove 135 formed in part by an annular guide wall 137 having an inner guide surface 139. Connecting rod 102 includes a guide pin 141 extending transversely from first portion 110 into guide groove 135. Inner surface 139 is shaped to form a minimal clearance with guide pin 141 throughout rotation to ensure the motion of connecting rod 102 as determined by crankpin offsets and transition offsets (described more fully hereinbelow). Also, guide wall 137 functions to pull the connecting rod downwardly during the intake stroke. Although gas pressure in the combustion chamber forces the respective piston and connecting rod downwardly during the power stroke, the cylinder pressure during the intake stroke is insufficient to move the piston in the absence of turbo- or super-charging. Guide wall 137 pulls on guide pin 141 during the intake stroke thereby ensuring that the connecting rod bearing surface 118 remains in abutment with crankpin bearing surface 132 and rotator surface 130 of transition rotator 122 during the appropriate portions of angular rotation corresponding to the intake stroke.

FIG. 1A illustrates connecting rod 102 in its outermost position with the engine piston at its top dead center (TDC) position, i.e. at the end of the compression stroke and the beginning of the power stroke. In this position, a minimum crankpin offset $CPO_{MIN}$ is indicated by the distance between the longitudinal axis 108 of crankshaft 106 and a minimum crankpin offset apex $CPOA_{MIN}$, which is the origin of the radius of curvature for both crankpin bearing surface 132 and connecting rod bearing surface 118, as shown in FIG. 1C. During rotation of the crankshaft, the crankpin offset apex will shift between $CPOA_{MIN}$ and a maximum crankpin offset apex $CPOA_{MAX}$ which defines a maximum crankpin offset $CPO_{MAX}$, corresponding to the distance between longitudinal axis 108 and $CPOA_{MAX}$. Thus, the present invention varies the moment arm in a predetermined manner to more closely achieve a predetermined ideal torque during rotation of the crankshaft as discussed more fully hereinbelow.

Figure 1D:
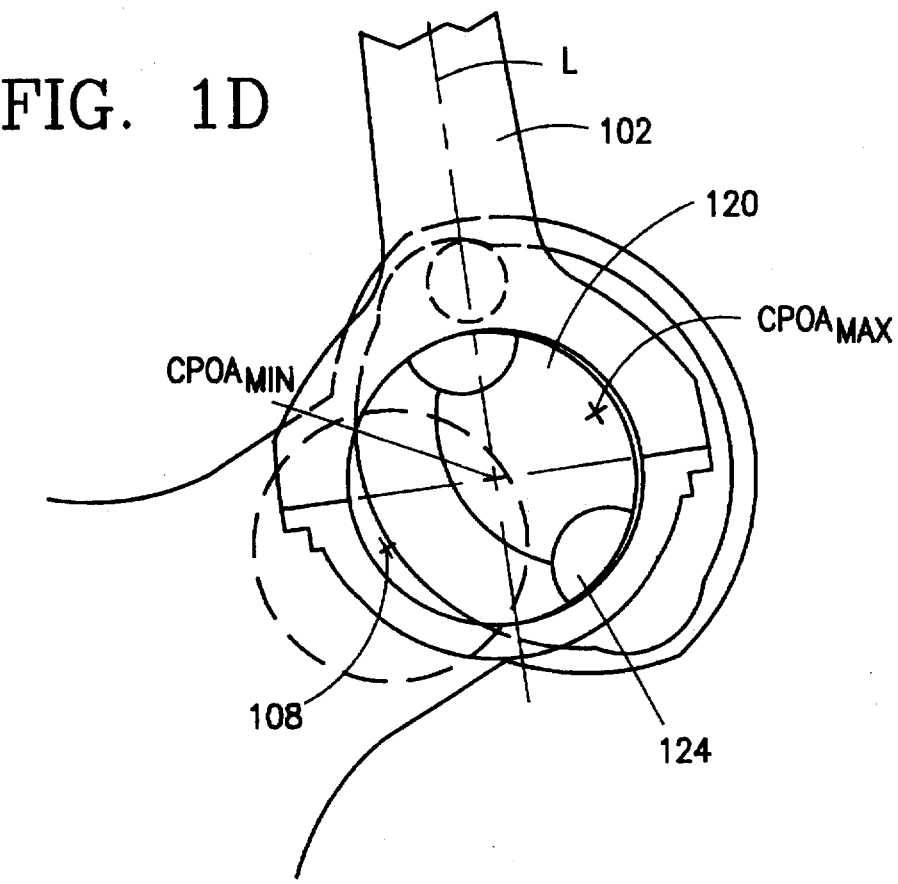
FIGS. 1D-1J are sequential end views of the variable offset crankshaft/connecting rod connection of the present invention at various rotational displacement increments during one rotation of the crankshaft.
Figure 1E:
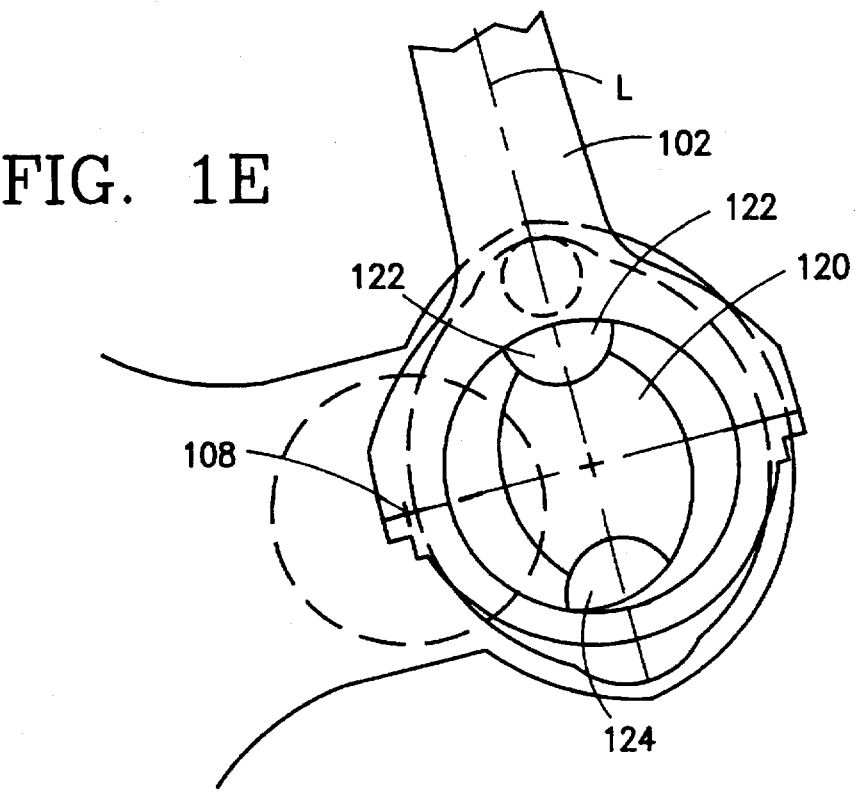
Figure 1F:
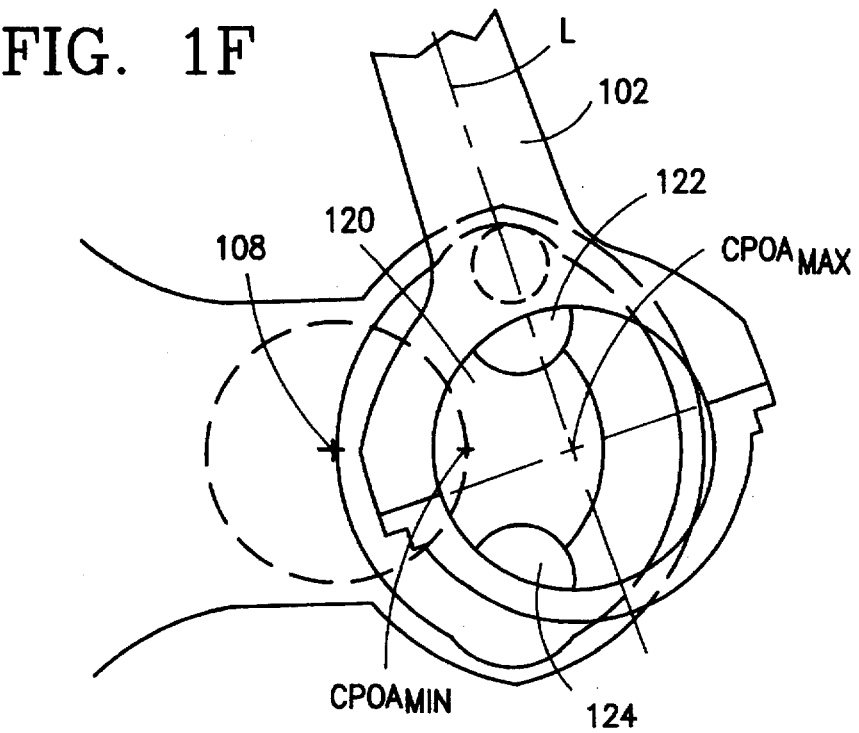
Figure 1G:
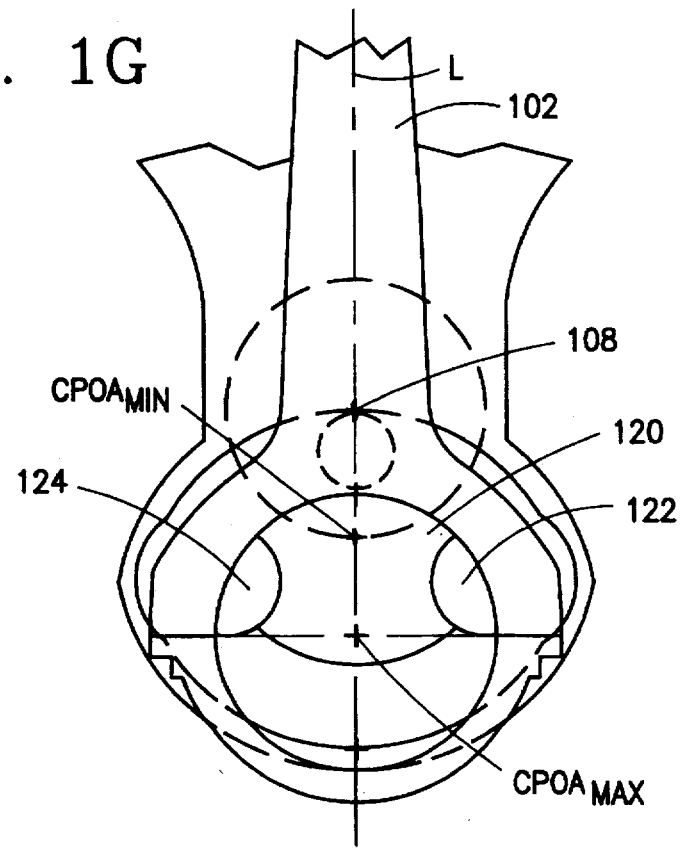

Now, referring to FIG. 1D, the variable offset connection 100 is illustrated with the piston (not shown) at the 60° after top dead center (ATDC) position as the piston moves through its power stroke. During the stroke, the downward force of connecting rod 102 imparts a clockwise torque to crankshaft 106 via crankpin assembly 104. As crankpin assembly 104 moves in the clockwise direction, crankpin bearing surface 132 slides along connecting rod bearing surface 118. Also, outer surfaces 130 of first and second transition rockers 122, 124 slide along connecting rod bearing surface 118. As shown in FIG. 1D, at a predetermined angular position of rotation, i.e. 65° ATDC, when TOA1 moves into alignment with the connecting rod centerline, indicated at L, connecting rod 102 begins to pivot relative to crankpin assembly 104, marking the end of the rotational arc utilizing $CPOA_{MIN}$, and the beginning of a rotational arc utilizing the linear distance between TOA1 and crankshaft axis 108 as the crankpin offset, hereinafter referred to as transition offset TO1. Thus, the circumferential position of TOA1 determines the timing of the beginning of the increasing transition period from $CPO_{MIN}$ to $CPO_{MAX}$ during which the crankpin offset increases from its minimum to its maximum value. TO1 remains the offset during the entire increasing transition period. Specifically, as crankpin 120 rotates in a clockwise direction around longitudinal axis 108, connecting rod 102 pivots in a counterclockwise direction away from longitudinal axis 108 so that connecting rod bearing surface 118 begins to pivot away from crankpin bearing surface 132 and toward crankpin bearing surface 134. As crankshaft 106 continues to rotate in a clockwise direction and crank end 109 of connecting rod 102 continues to slidably move away from longitudinal axis 108 (FIG. 1E), first transition rocker 122 pivots in first cavity 126 until bearing surface 118 abuts crankpin bearing surface 134 as shown in FIG. 1F. During this movement, outer surface 130 of first transition rocker 122 remains in continuous abutment with connecting rod bearing surface 118 with TOA1 in alignment with the connecting rod centerline L. Also, as connecting rod bearing surface 118 approaches crankpin bearing surface 134, outer surface 130 of second transition rocker 124 pivots into abutment with bearing surface 118 as shown in FIG. 1F. In this position, the crankpin offset apex has now shifted to $CPOA_{MAX}$ with $CPO_{MAX}$ being the crankpin offset. Thus, the effect of the movement of the connecting rod 102 from the position shown in FIG. 1D to the position shown in FIG. 1F is to shift the crankpin offset dimension from $CPO_{MIN}$ to TO1, which functions as the crankpin offset during the transition period, and then to $CPO_{MAX}$ when the connecting rod center C coincides with the $CPOA_{MAX}$. The maximum offset $CPO_{MAX}$ is maintained as the piston moves to its bottom dead center (BDC) position as shown in FIG. 1G.

Figure 1H:
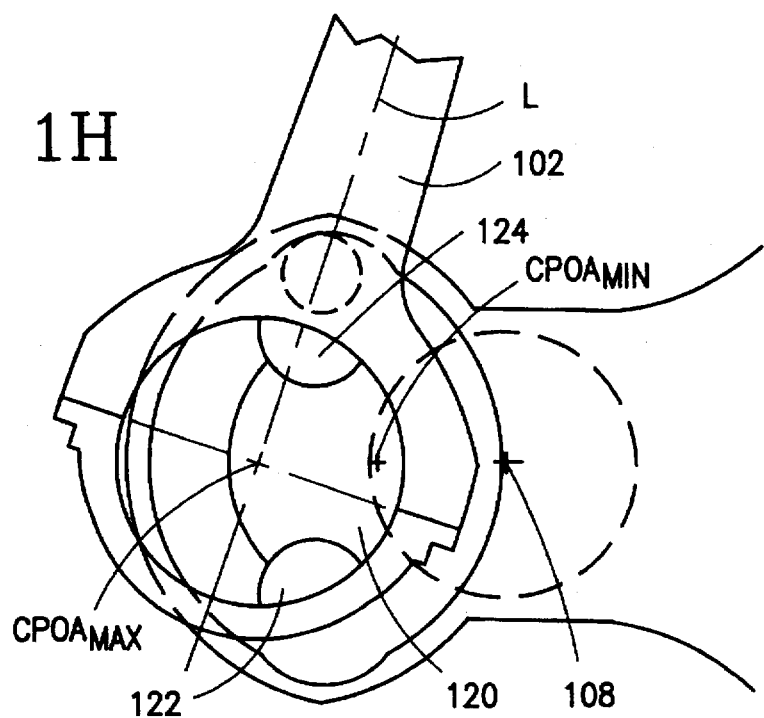
Figure 1I:
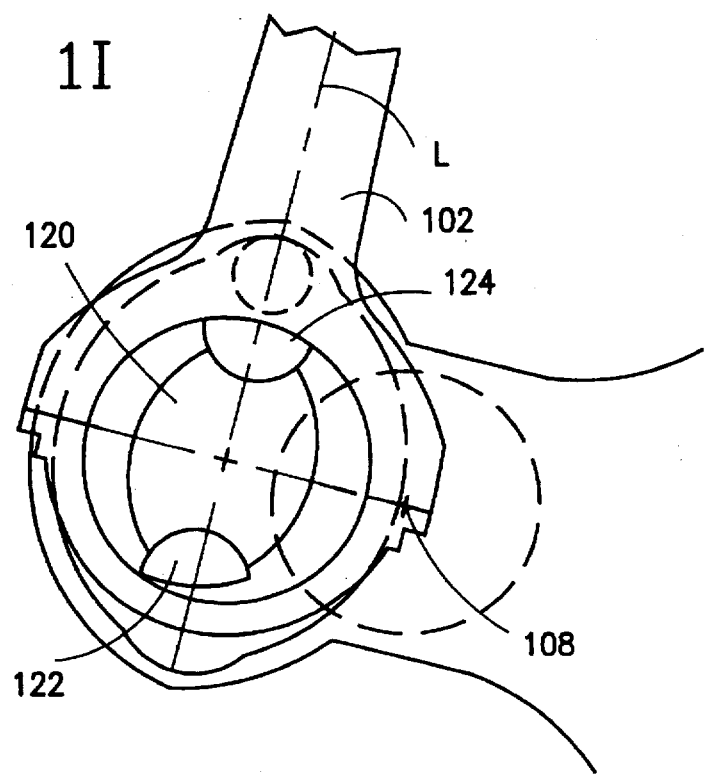
Figure 1J:
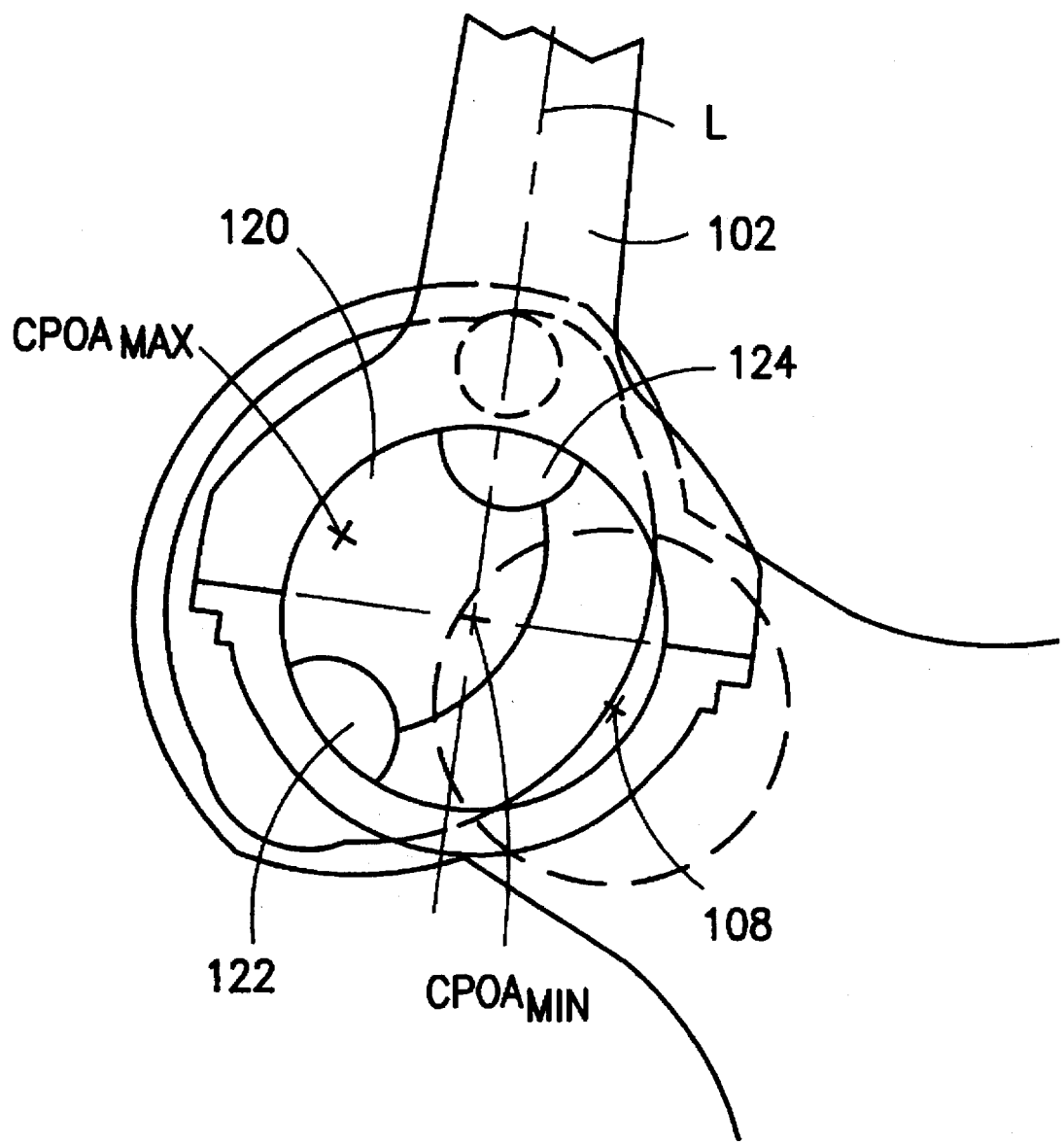

Therefore, it can be seen that the variable offset connection 100 of the present invention shifts the position of the offset apex of connecting rod 102 relative to crankshaft longitudinal axis 108 so as to vary the moment arm in an optimal manner during the power stroke. Referring now to FIG. 1H, as crankshaft 106 continues to rotate in the clockwise direction, the exhaust stroke begins and the associated piston begins to move outwardly. During this movement of the piston toward the TDC position, the connecting rod 102 slidably pivots relative to crankpin assembly 104 such that crankpin bearing surface 134, and outer surfaces 130 of first and second transition rockers 122 and 124, slidably move, in a clockwise direction, along connecting rod bearing surface 118. During this rotation, $CPO_{MAX}$ is maintained as shown in FIG. 1H with the piston at approximately 90° before top dead center (BTDC). At a predetermined angular position of rotation when TOA2 moves into alignment with the connecting rod centerline L, connecting rod 102 begins to pivot relative to crankpin assembly 104, marking the end of the rotational arc utilizing $CPOA_{MAX}$ and $CPO_{MAX}$, and the beginning of a rotational arc utilizing the linear distance between TOA2 and crankshaft axis 108 as the crankpin offset (hereinafter referred to as transition offset TO2). Thus, the circumferential position of TOA2 determines the timing of the beginning of the decreasing transition period from $CPO_{MAX}$ to minimum $CPO_{MIN}$. Continued rotation of crankshaft 106 in a clockwise direction causes connecting rod 102 to pivot in a clockwise direction as shown in FIG. 1I, toward longitudinal axis 108 so that connecting rod bearing surface 118 begins to move toward crankpin bearing surface 132 and away from crankpin bearing surface 134. As crankshaft 106 continues to rotate in a clockwise direction and crank end 109 of connecting rod 102 continues to pivot toward longitudinal axis 108, second transition rocker 124 pivots in second concavity 128 until crankpin bearing surface 134 abuts bearing surface 118 as shown in FIG. 1J. During this movement, outer surface 130 of second transition rocker 124 remains in continuous abutment with connecting rod bearing surface 118 with TOA2 in alignment with the connecting rod centerline L. Also, as connecting rod bearing surface 118 approaches crankpin bearing surface 132, outer surface 130 of first transition rocker 122 pivots into abutment with bearing surface 118 as shown in FIG. 1J. In this position, the crankpin offset apex has now shifted to $CPOA_{MIN}$ and the offset value to $CPO_{MIN}$. Thus, the effect of the movement of the connecting rod 102 from the position shown in FIG. 1H to the position shown in FIG. 1J is to shift the offset from $CPO_{MAX}$ to TO2 and then from TO2 to $CPO_{MIN}$ so that the connecting rod center C coincides with $CPOA_{MIN}$ as illustrated by FIG. 1J. $CPO_{MIN}$ is maintained as the piston moves to its TDC position as shown in FIG. 1A. Thus, first and second transition rockers 122 and 124 effectively permit smooth transitional movement of connecting rod 102 relative to crankpin 120 during each transition between $CPO_{MIN}$ and $CPO_{MAX}$ over a range of angular rotation while effectively transmitting forces between connecting rod 102 and its crankpin 120. As a result, the moment arm can be optimally varied resulting in an output torque from the engine, during each increment of rotation, which more closely approximates an optimum constant torque.

The movements of the components of variable offset connection 100 during the intake stroke, which follows the exhaust stroke in a four stroke engine, are the same as described hereinabove with respect to the power stroke. Also, the compression stroke, which follows the intake stroke, is identical to the exhaust stroke as described hereinabove. The minimum and maximum crankpin offset apexes $CPOA_{MIN}$ and $CPOA_{MAX}$, the corresponding offset dimensions $CPO_{MIN}$ and $CPO_{MAX}$, the transition offset apexes TOA1 and TOA2, and the corresponding transition offsets TO1 and TO2, remain unchanged.

In accordance with the present invention the shape and dimensions of the crankpin assembly can be determined, i.e. the crankpin and transition offset apexes, which produces a variable offset and corresponding desired moment arms at specific displacement increments throughout rotation to create a more constant torque output relative to an ideal mean torque value. Specifically, the present method permits the determination of $CPO_{MIN}$, $CPO_{MAX}$, TO1, TO2 and thus the timing of the beginning, and duration, of the transition periods so as to optimally vary the moment arms throughout rotation.

The determination of the optimum crankpin offsets necessary to achieve optimum torque output requires the calculation of an ideal mean torque as a target value. The ideal mean torque for a given engine may be calculated by averaging the resultant torque values experienced by the crankshaft for a selected number of increments of cylinder volume displaced during the power stroke.

Referring to Table I, the crankshaft torque per square inch for a single cylinder at various displacement increments can be determined from known engine values for any given engine. For example, Table I sets forth the pressure and displacement, respectively, of an individual cylinder for an engine including a conventional crankpin/connecting rod connection having a fixed crankpin offset equal to one-half the stroke, e.g., 2 inches. Thus, columns A and B of Table I reflect an individual cylinder's pressure-volume diagram in a columnized format. The displacement increments correspond to every 10 degrees of crankshaft rotational displacement (column C). The moment arm, i.e. leveraging effect, of the connecting rod upon the crankshaft can be calculated for each displacement increment using the 2 inch offset and the well known geometry produced by a circular offset configuration (column D). Thereafter, the product of the moment arm for each increment and the corresponding cylinder pressure is the crankshaft torque magnitude per square inch of piston area for each increment (column E).

Table I is based on a power stroke of 0°–180°, and a compression stroke of 180°–360°, while omitting the intake and exhaust strokes which comprise another 360°. The intake and exhaust strokes make no torque contribution to the engine torque output and minimal torque demands. As a result, these strokes have been omitted to simplify the calculations and enhance the clarity of the present example, but could be taken into consideration if a more refined approach is desired, as explained more fully hereinbelow.

TABLE I

INCREMENTAL TORQUE CALCULATION FOR SINGLE CYLINDER

| A DISPLACEMENT INCREMENT (CHANGE IN STROKE FROM TOC) | B CYLINDER FORCE-P.S.I. | C CRANKSHAFT ROTATION DEGREES | D CRANKSHAFT MOMENT ARM-INCHES | E CRANKSHAFT LB.-IN. PER SQ. IN. |
|---|---|---|---|---|
| 0" | 700 | 0 | 0 | 0 |
|  | 670 | 10 | .44 | 683 |
|  | 600 | 20 | .87 | 605 |
|  | 550 | 30 | 1.23 | 518 |
|  | 460 | 40 | 1.55 | 441 |
|  | 306 | 50 | 1.80 | 342 |
|  | 282 | 60 | 1.97 | 282 |
|  | 234 | 70 | 2.06 | 228 |
|  | 195 | 80 | 2.06 | 191 |
|  | 164 | 90 | 2.00 | 159 |
|  | 137 | 100 | 1.88 | 137 |
|  | 124 | 110 | 1.70 | 122 |
|  | 110 | 120 | 1.50 | 116 |
|  | 100 | 130 | 1.26 | 102 |
|  | 90 | 140 | 1.02 | 95 |
|  | 80 | 150 | .77 | 90 |
|  | 70 | 160 | .51 | 87 |
|  | 50 | 170 | .26 | 40 |
| 4" | 30 | 180 | 0 |  |
|  |  | 190 | .26 |  |
|  |  | 200 | .51 |  |
|  |  | 210 | .77 |  |
|  |  | 220 | 1.02 |  |
|  |  | 230 | 1.26 |  |
|  |  | 240 | 1.50 |  |
|  |  | 250 | 1.70 |  |
|  | 4 | 260 | 1.88 | −4 |
|  | 19 | 270 | 2.00 | −17 |
|  | 35 | 280 | 2.06 | −32 |
|  | 55 | 290 | 2.06 | −52 |
|  | 68 | 300 | 1.97 | −68 |
|  | 95 | 300 | 1.80 | −95 |
|  | 120 | 320 | 1.55 | −114 |
|  | 150 | 330 | 1.23 | −141 |
|  | 165 | 340 | .87 | −167 |
|  | 175 | 350 | .44 | −184 |
| 0" |  | 360 | 0 | −190 |

Referring now to Table II, the individual cylinder torque values of Table I may then be used to determine the total combined torque on the crankshaft during each displacement increment due to the gas pressure on each piston associated with each cylinder of the engine during the power stroke of cylinder 1. Assuming a 6 cylinder engine, Table II need only consider 120° of displacement of the crankshaft since each of the 6 cylinders begin a power stroke 120° after the previous one began its power stroke, to form a repeating 120° cycle. It will be appreciated by those skilled in the art that this 120° repeating cycle is standard for a 4 cycle 6 cylinder engine, as is a 90° repeating cycle standard for an 8 cylinder engine, and a 180° repeating cycle standard for a 4 cylinder engine.

TABLE II

CALCULATION OF IDEAL MEAN TORQUE

| CRANKSHAFT ROTATION | CYLINDER NO./STROKE | | | | | | TOTAL TORQUE |
|---|---|---|---|---|---|---|---|
| DEGREES | 1 | 2 | 3 | 4 | 5 | 6 | VALUES |
| 10 | 300 | | | 129 | | | 429 |
| 20 | 526 | | | 97 | −7 | | 616 |
| 30 | 637 | | | 69 | −34 | | 672 |
| 40 | 684 | | | 44 | −64 | | 664 |
| 50 | 629 | | | 11 | −104 | | 536 |
| 60 | 555 | | | 0 | −134 | | 421 |
| 70 | 470 | | | | −162 | | 308 |
| 80 | 393 | | | | −176 | | 217 |
| 90 | 318 | | | | −173 | | 145 |
| 100 | 258 | | | | −145 | | 113 |
| 110 | 207 | | | | −81 | | 126 |
| 120 | 174 | | | | | | 174 |
| TOTAL | | | | | | | 4421 |
| IDEAL MEAN TORQUE | | | | | | | 368 |

Table II displays, for engine cylinders 1 through 6, with cylinder 1 at 0° T.D.C. at the beginning of its power stroke, the torque magnitude values for each cylinder at the respective displacement points. As is evident, cylinder 5 is undergoing a compression stroke during this particular 20° cycle resulting in negative torque values. Cylinder 4 is in the last 60° of its power stroke while cylinders 2, 3 and 6 are in their exhaust and/or intake strokes. The torque values for all cylinders are totaled for each displacement, resulting in total torque values taking into account the contributions and parasitic effects of all engine cylinders for each displacement point. The total torque values are then summed and divided by the number of increments, i.e. 12, to calculate the ideal mean torque value, i.e. 368.

An alternative method of determining the ideal mean torque value available to each rotational increment may be achieved by, first, determining the mean pressure of an engine cylinder using, for example, a pressure-volume diagram and then determining the number of power strokes that occur during a single 180° revolution, i.e. one for a 4 cylinder, 1.5 for a 6 cylinder, 2 for an 8 cylinder, assuming a 4 cycle engine. The mean pressure, per square inch of cylinder area, available to all rotational displacement increments can then be calculated by multiplying the mean pressure by the number of power strokes. The mean moment arm of the crankshaft crankpin is calculated by dividing the displacement length, i.e. stroke, which in the present example is 4 inches, by 4, as dictated by the circular path traversed by the crankpin. Thereafter, multiplying the mean pressure per square inch of cylinder area by the mean moment arm yields the ideal torque magnitude available to each rotational increment, which for the 6 cylinder engine of the preceding example is 368.

Figure 2:
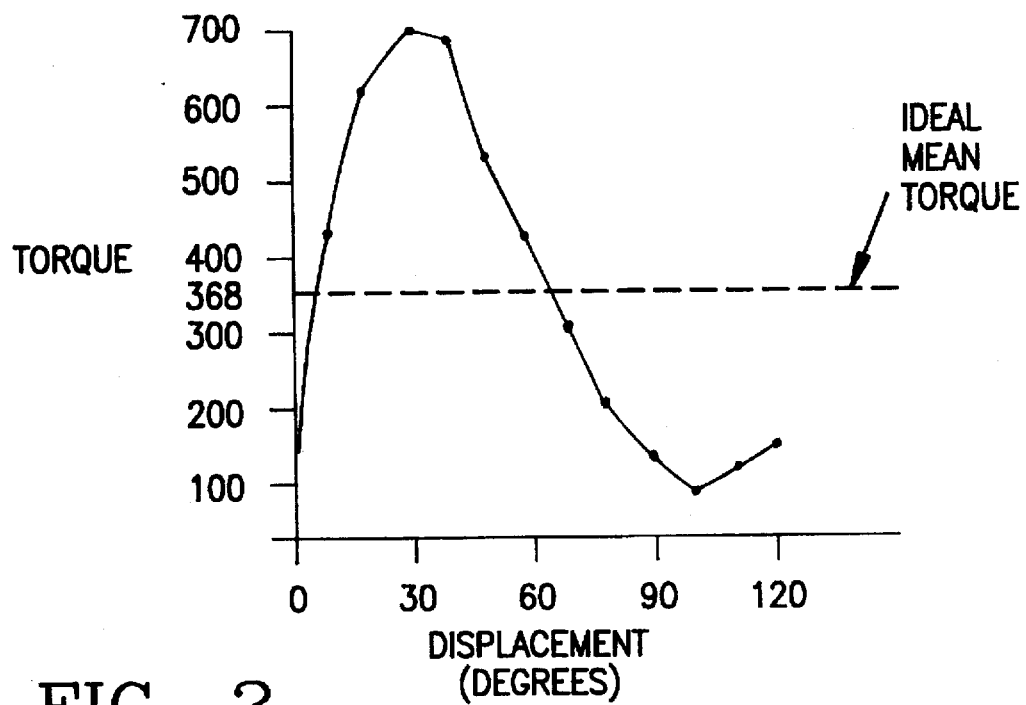
FIG. 2 graphically illustrates the torque output of the engine crankshaft during 120° of displacement for a conventional engine having a single fixed offset crankpin.

The torque values from the "total" 0 column of Table II are graphically illustrated in FIG. 2. As can be seen, the torque experienced by the crankshaft fluctuates dramatically throughout the rotation of the shaft. Also illustrated in FIG. 2 is the ideal mean torque value of 368. The unnecessarily large deviations of the actual torque from the ideal torque throughout the rotational displacement of the crankshaft creates undesirable inefficiencies in engine operation due to an inefficient work path for the mechanical transition of torque during the displacement. In addition, extreme torque fluctuations necessarily result in undesirable torsional vibrations in the engine drive train requiring various complex and expensive damping devices and resilient connections to other crankshaft driven components, in order to minimize component wear and damage. Also, the vibrations may be transferred to the engine timing gear train undesirably causing increased noise, premature engine wear and, thus, reduced gear and shaft life.

The variable offset crankshaft/connecting rod connection 100 of the present invention may be designed in accordance with the method of the present invention to produce an optimum torque output which more closely approximates the ideal torque value, thereby avoiding the inefficiencies and deleterious effects associated with excessive torque fluctuations. The inconsistent torque magnitudes for a single cylinder at each displacement increment of Table I is due to both the changing gas pressure in the cylinder and the varying moment arm dimension as shown in Table I. Although the gas pressure is not efficiently subject to control, the variable offset connection 100 of the present invention can be used to vary the moment arm during rotation in an optimal manner to achieve a more consistent torque magnitude at each increment. As is well known, the moment arm dimension is a by-product of the geometric relationship between the connecting rod force component applied along the centerline of the connecting rod and the centerline of the crankshaft at each displacement point. The connecting rod force component is, of course, determined by a geometric relationship between the centerline of the piston and the connecting rod. Thus, in order to create a more consistent torque magnitude at each displacement increment, it is necessary to vary the moment arm during rotation in such a manner that, when the moment arm is multiplied by the cylinder pressure at a corresponding displacement point and the contributions of all cylinders are summed, a torque magnitude is produced for the engine which approximates the ideal torque value. Specifically, with reference to Table II and FIG. 2, it can be seen that the total torque undesirably increases to an excessive level above ideal mean torque 368 during a first portion of the power stroke and then undesirably decreases to an excessively low level below 368 during the latter portion of the power stroke. Thus, decreasing the crankpin offset and, therefore, the moment arm during the first portion of the power stroke, and increasing the offset and moment arm during the latter portion would appear to be a first step toward limiting the peak deviations from the mean ideal torque.

Having determined an ideal mean torque magnitude of 368 for each displacement point in the above-described example, optimum moment arm dimensions for the crankpin assembly of the present invention at each of the displacement increments may now be calculated using an iterative process of selecting minimum and maximum crankpin offsets, $CPO_{MIN}$ and $CPO_{MAX}$, and transition offsets, TO1 and TO2, and using these offsets to calculate the moment arm at each displacement increment until the total torque, caused by the effects of all cylinders at each increment approximates the ideal torque as closely as practically possible. The iterative process will be discussed with respect to Tables III and IV which, although similar to Tables I and II, are very different in the use of minimum and maximum crankpin offsets and transition offsets to determine the moment arms at each displacement increment. It will be appreciated, in lieu of the columnar calculation process of Tables III and IV, a computer algorithm, based on the same process, may be used to more effectively and quickly determine the minimum and maximum crankpin offsets and the transition offsets, and the corresponding apexes, which result in the optimum moment arm values.

TABLE III

INCREMENTAL TORQUE CALCULATION FOR SINGLE CYLINDER

| A DISPLACEMENT INCREMENT (CHANGE IN STROKE FROM TOC) | B CYLINDER FORCE-P.S.I. | C CRANKSHAFT ROTATION DEGREES | D CRANKSHAFT MOMENT ARM-INCHES | E CRANKSHAFT LB.-IN. PER SQ. IN. |
|---|---|---|---|---|
| 0 | 700 | 0 | 0 | 0 |
|  | 680 | 10 | .24 | 163 |
|  | 650 | 20 | .46 | 299 |
|  | 599 | 30 | .67 | 401 |
|  | 539 | 40 | .82 | 442 |
|  | 477 | 50 | .96 | 458 |
|  | 421 | 60 | 1.06 | 446 |
|  | 350 | 70 | 1.32 | 462 |
|  | 291 | 80 | 1.71 | 498 |
|  | 236 | 90 | 2.02 | 477 |
|  | 194 | 100 | 2.30 | 446 |
|  | 155 | 110 | 2.35 | 364 |
|  | 134 | 120 | 1.67 | 224 |
|  | 120 | 130 | 1.50 | 180 |
|  | 105 | 140 | 1.31 | 138 |
|  | 98 | 150 | 1.23 | 121 |
|  | 85 | 160 | 1.06 | 90 |
|  | 50 | 170 | .62 | 31 |
|  | 20 | 180 | .25 | 5 |
| B.D.C. 4.00 | 0 | 185.5 | 0 | 0 |
|  |  | 190 | .17 |  |
|  |  | 200 | .46 |  |
|  |  | 210 | .77 |  |
|  |  | 220 | 1.12 |  |
|  |  | 230 | 1.42 |  |
|  | −2 | 240 | 1.80 | −4 |
|  | −4 | 250 | 2.02 | −8 |
|  | −21 | 260 | 2.15 | −45 |
|  | −50 | 270 | 2.18 | −109 |
|  | −76 | 280 | 2.02 | −154 |
|  | −104 | 290 | 1.74 | −181 |
|  | −124 | 300 | 1.46 | −181 |
|  | −131 | 310 | 1.07 | −140 |
|  | −147 | 320 | .81 | −119 |
|  | −165 | 330 | .67 | −111 |
|  | −179 | 340 | .46 | −82 |
|  | −187 | 350 | .24 | −45 |
| 0 | −190 | 360 | 0 | 0 |

TABLE IV

CALCULATION OF TOTAL TORQUE DUE TO CYLINDER PRESSURE AT EACH INCREMENT

| CRANKSHAFT ROTATION DEGREES | CYLINDER NO. | | | | | | TOTAL TORQUE VALUES |
|---|---|---|---|---|---|---|---|
|  | 1 | 2 | 3 | 4 | 5 | 6 |  |
| 10 | 163 |  |  | 180 | −8 |  | 335 |
| 20 | 299 |  |  | 138 | −45 |  | 392 |
| 30 | 401 |  |  | 121 | −109 |  | 413 |
| 40 | 442 |  |  | 90 | −154 |  | 378 |
| 50 | 458 |  |  | 31 | −181 |  | 308 |
| 60 | 446 |  |  | 5 | −181 |  | 270 |
| 70 | 462 |  |  | 0 | −140 |  | 322 |
| 80 | 498 |  |  |  | −119 |  | 379 |
| 90 | 477 |  |  |  | −111 |  | 366 |
| 100 | 446 |  |  |  | −82 |  | 364 |
| 110 | 364 |  |  |  | −45 |  | 319 |
| 120 | 224 |  |  |  | 0 |  | 224 |

Initially, with knowledge of the engine stroke, estimated values of minimum and maximum crankpin offsets may be selected to permit computational testing using Tables III and IV and well known geometric relationships to start the iterative process and, ultimately, derive optimum crankpin offsets. Since the maximum and minimum crankpin offsets achieved during a rotation of the crankshaft will determine the piston stroke dimension and the stroke dimension is fixed for each engine (i.e., at 4 inches for the present example) the sum of the minimum and maximum crankpin offsets must equal the stroke dimension. A ratio of approximately 30:70 of the stroke dimension for the minimum and maximum crankpin offsets, respectively, has been found to be a reasonably close initial ratio for beginning computational testing for the six cylinder engine of the present example, thus resulting in an initial estimated $CPO_{MIN}$ of 1.20 and an initial estimated $CPO_{MAX}$ of 2.80. It has been found that an initial ratio closer to ¼–¾ is more appropriate for engines having fewer cylinders and/or higher compression ratios.

The initial estimated transition crankpin offset apexes TOA1 and TOA2 are then selected as follows. First, the circumferential position of TOA1 relative to $CPO_{MIN}$ is determined by initially selecting the angle during the power stroke at which the beginning of the transition from $CPO_{MIN}$ to $CPO_{MAX}$ will occur. At this angle, e.g. 65° ATDC, TOA1 will align with connecting rod centerline L, which extends through $CPO_{MIN}$. The radial position of TOA1 along connecting rod centerline L can be determined by initially choosing a distance equal to 90% of $CPO_{MAX}$. The product of this percentage and the maximum offset value equals the radial distance between TOA1 and the crankshaft axis 108 along connecting rod centerline L. The selection of the radial position of TOA1 controls the duration of the transition period, e.g., from 65°–110° ATDC. The circumferential position of TOA2 and the corresponding crankpin offset TO2 may be determined in a similar manner to that of TOA1 by initially choosing a desired angle for the beginning of the decreasing transition period from $CPOA_{MAX}$ to $CPOA_{MIN}$ during the compression stroke, e.g., 240° ATDC. The radial position of TOA2 along connecting rod centerline L can be determined by initially choosing a distance equal to 96% of $CPO_{MAX}$. The product of this percentage and the maximum offset value equals the radial distance between TOA2 and the crankshaft axis 108 along connecting rod centerline L. The selection of the radial position of TOA2 controls the duration of the transition period, e.g., from 240°–310° ATDC. However, it has been found that for computational simplicity, initially, TOA1 and TOA2 may be assumed to be positioned on the respective outer surfaces 130 of rotators 122 and 124, respectively. If TOA1 is assumed to lie on the outer surface 130, then the corresponding crankpin offset dimensions TO1 and TO2 may be easily calculated from the geometry of the arrangement.

Figure 3:
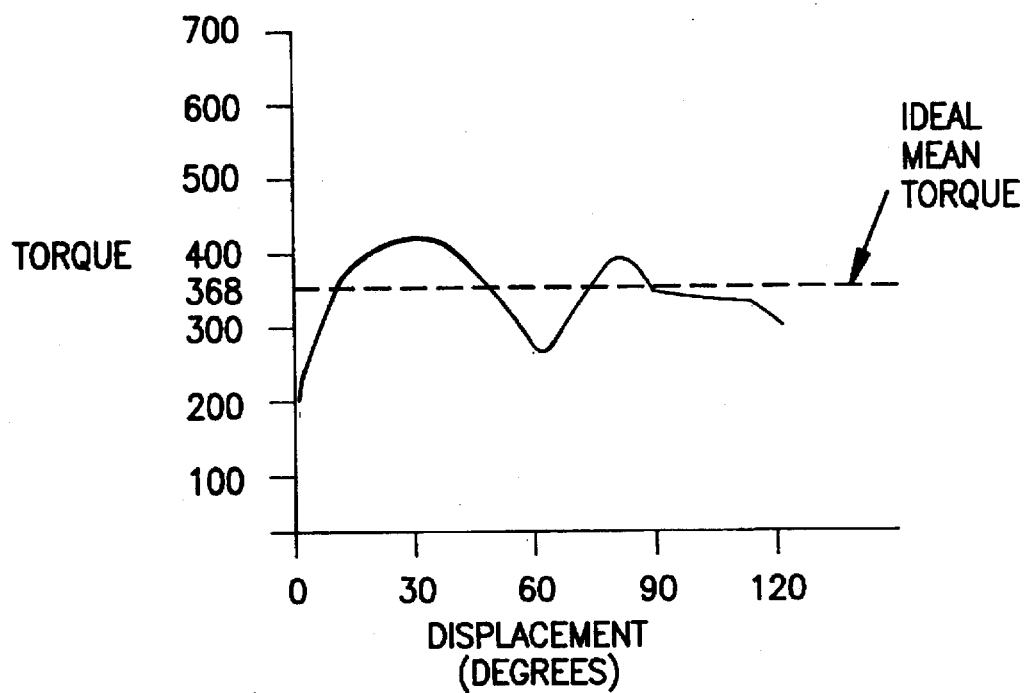
FIG. 3 graphically illustrates the torque output of the engine crankshaft during 120° of displacement for an engine having a variable offset crankpin in accordance with the present invention.

The moment arms for each increment in Table III are then calculated using the selected offsets in the following manner. The initially selected minimum crankpin offset $CPO_{MIN}$ of 1.20 inches is used to calculate the moment arm values for each of the displacement/rotational increments from 310°–65° ATDC while the initially selected maximum crankpin offset $CPO_{MAX}$ of 2.80 inches is used to calculate the moment arm values for each increment from 110°–240° ATDC. Using well known geometric relationships, the moment arm values during the transition periods may then be calculated using the increasing transition offset TO1 from 65°–110° ATDC and the decreasing transition offset TO2 from 240°–310° ATDC. The crankshaft torque for a single cylinder at each displacement increment may then be calculated from the corresponding cylinder pressure using the moment arm values calculated for each increment. The crankshaft torque values are then transferred into the appropriate columns in Table IV for cylinders 1–6, assuming cylinder 1 at 0° TDC at the beginning of its power stroke, and summed to generate the total torque for each rotational increment. The total torque values at each increment can then be individually compared to the ideal mean torque value of 368 to determine the extent of the deviation of each total torque value. FIG. 3 illustrates a graphical comparison of the total torque values relative to the ideal mean torque value of 368 over 120 degrees. A comparison of the graph of FIG. 3 with the graph of FIG. 2 reveals that the use of minimum and maximum crankpin offsets of 1.20 and 2.80 results in a substantially more constant torque output than a fixed 2 inch crankpin offset. Based on a comparison of ideal mean torque 368 with the total torque values of Table IV, and FIG. 3, adjustments can be made to the initially selected minimum and maximum crankpin offset values, transition offset values, duration of the transition periods (i.e., by adjusting radial spacing of TOA1 and TOA2) and/or the timing of the beginning of the transition periods (i.e., by adjusting the circumferential position of TOA1 and TOA2). For example, referring to FIG. 1D, which illustrates the beginning of the increasing transition period, the timing of the beginning could be delayed in the rotation by designing rotator 122 to position TOA1 circumferentially to the left in FIG. 1D, or advanced by positioning TOA1 circumferentially to the right. The radial position of TOA1 and TOA2 affects the linear spacing between crankshaft axis 108 and the respective transition offset apex, thus affecting the respective transition crankpin offsets TO1, TO2 during the transition periods. Moreover, the radial position of TOA1 and TOA2 controls the duration of the respective transition periods. The closer TOA1 and TOA2 are to crankshaft axis 108 the slower the rate of change between $CPOA_{MIN}$ and $CPOA_{MAX}$ and therefore the greater the duration of the respective transition period, and vice versa. Therefore, the circumferential and radial positions of TOA1 and TOA2 can be varied during the iterative process of the present invention to modify the corresponding crankpin transition offsets, and the timing and duration of the transition periods, thus adding various degrees of control, in addition to the selection of $CPO_{MIN}$ and $CPO_{MAX}$, in achieving an optimum torque output. After a new set of values is selected, the calculation is repeated and the total torque values at each increment resulting from these new offsets are again compared to the ideal mean torque of 368. As with any iterative calculation, this procedure may be repeated until the crankpin offset combination, including minimum, maximum and transition values, best reproducing the net mean torque value of 368, i.e., the deviation of the actual torque from the ideal mean torque value is minimized, is achieved.

Although the present method as discussed hereinabove with respect to Tables I–IV and FIGS. 2–3 achieves relatively consistent engine torque output, the preceding embodiment of the method only considered the effects of cylinder gas pressure on the resulting torque. However, effects and forces other than gas pressure effects can alter the output torque. Therefore, if desired, these other effects may be considered in the determination of the crankpin offsets using the method of the present invention.

An example of an effect likely to be deemed inconsequential in most instances and, therefore, justifiably ignored during design, would be the work and torque required to operate the cylinder valves at particular displacement increments. On the other hand, an example of an effect likely to be deemed of consequence, would be the inertial force effects caused by the reciprocating motion of each piston/ connecting rod assembly. These inertial effects include both positive and negative forces acting on the crankpin during each stroke of each piston. As a result, the inertial force magnitudes change continuously, possibly reaching magnitudes comparable to the gas pressure force. Consequently, the second embodiment of the present method, as described with respect to Tables V and VI, and FIGS. 4 and 5, includes the consideration of these inertial forces on the output torque.

TABLE V

INCREMENTAL INERTIAL FORCE CALCULATION FOR SINGLE CYLINDER

| CHANGE IN KINETIC ENERGY | TOTAL KINETIC ENERGY | TORQUE DUE TO INERTIAL FORCE | DISPLACEMENT FROM TOC | CRANKSHAFT ROTATION DEGREES | CYLINDER PRESSURE | MOMENT ARM | TORQUE DUE TO GAS PRESSURE |
|---|---|---|---|---|---|---|---|
| 0 | 0 | 0 | 0 | 0 | 700 | 0 | 0 |
| 0 | 0 | 0 |  | 10 | 680 | .24 | 163 |
| (1.0) | 1.0 | (5) |  | 20 | 650 | .46 | 299 |
| (1.7) | 2.7 | (9) |  | 30 | 599 | .67 | 401 |
| (3.0) | 5.7 | (16) |  | 40 | 539 | .82 | 442 |
| (2.3) | 8.0 | (13) |  | 50 | 477 | .96 | 458 |
| (1.3) | 9.3 | (7) |  | 60 | 421 | 1.06 | 446 |
| (4.4) | 13.7 | (24) |  | 70 | 350 | 1.32 | 462 |
| (11.5) | 25.2 | (63) |  | 80 | 291 | 1.71 | 498 |
| (12.1) | 37.3 | (67) |  | 90 | 236 | 2.02 | 477 |
| (8.4) | 45.7 | (46) |  | 100 | 194 | 2.30 | 446 |
| (9.2) | 54.9 | (51) |  | 110 | 155 | 2.35 | 364 |
| +9.2 | 45.7 | +51 |  | 120 | 134 | 1.67 | 224 |
| +8.4 | 37.3 | +46 |  | 130 | 120 | 1.50 | 180 |
| +9.9 | 27.4 | +54 |  | 140 | 105 | 1.31 | 138 |
| +8.4 | 19.0 | +46 |  | 150 | 98 | 1.23 | 121 |
| +8.3 | 10.7 | +46 |  | 160 | 85 | 1.06 | 90 |
| +6.0 | 4.7 | +32 |  | 170 | 50 | .62 | 31 |
| +2.4 | 2.3 | +13 |  | 180 | 20 | .25 | 5 |
| +2.3 | 0 | +13 | 4 | 185.5B.D.C. | 0 | 0 | 0 |
| 0 | 0 | 0 |  | 190 |  | .17 |  |
| (1.0) | 1.0 | (5) |  | 200 |  | .46 |  |
| (1.5) | 2.5 | (8) |  | 210 |  | .77 |  |
| (6.8) | 9.3 | (37) |  | 220 |  | 1.12 |  |
| (9.7) | 19.0 | (53) |  | 230 |  | 1.42 |  |
| (8.4) | 27.4 | (46) |  | 240 | −2 | 1.80 | −4 |
| (24.4) | 51.8 | (134) |  | 250 | −4 | 2.02 | −8 |
| (36.1) | 87.9 | (199) |  | 260 | −21 | 2.15 | −45 |
| (12.7) | 100.6 | (70) |  | 270 | −50 | 2.18 | −109 |
| +24.5 | 76.1 | +135 |  | 280 | −76 | 2.02 | −154 |
| +36.1 | 40.0 | +199 |  | 290 | −104 | 1.74 | −181 |
| +22.8 | 17.2 | +125 |  | 300 | −124 | 1.46 | −181 |
| +12.5 | 4.7 | +69 |  | 310 | −131 | 1.07 | −140 |
| +3.7 | 1.0 | +20 |  | 320 | −147 | .81 | −119 |
| (2.0) | 3.0 | (11) |  | 330 | −165 | .67 | −111 |
| 0 | 3.0 | 0 |  | 340 | −179 | .46 | −82 |
| +2.0 | 1.0 | +11 |  | 350 | −187 | .24 | −45 |
| +1.0 | 0 | +5 | 0 | 360 | −190 | 0 | 0 |

TABLE VI

CALCULATION OF COMBINED TOTAL TORQUE AT EACH INCREMENT

| CRANKSHAFT ROTATION DEGREES | CYLINDER NO. TORQUE DUE TO GAS/INERTIAL FORCES | | | | | | A TOTAL TORQUE DUE TO INERTIAL FORCES | B TOTAL TORQUE DUE TO CYLINDER PRESSURE | C COMBINED TOTAL TORQUE VALUES |
|---|---|---|---|---|---|---|---|---|---|
|  | 1 | 2 | 3 | 4 | 5 | 6 |  |  |  |
| 10 | 163/0 |  |  | 180/46 | −8/(134) |  | (88) | 335 | 247 |
| 20 | 299/(5) |  |  | 138/54 | −45/(199) |  | (150) | 392 | 242 |
| 30 | 401/(8) |  |  | 121/46 | −109/(70) |  | (32) | 413 | 381 |
| 40 | 442/(16) |  |  | 90/46 | −154/135 |  | 165 | 378 | 543 |
| 50 | 458/(13) |  |  | 31/32 | −181/199 |  | 218 | 308 | 526 |

TABLE VI-continued

CALCULATION OF COMBINED TOTAL TORQUE AT EACH INCREMENT

| CRANKSHAFT ROTATION | CYLINDER NO. TORQUE DUE TO GAS/INERTIAL FORCES | | | | | | A TOTAL TORQUE DUE TO INERTIAL | B TOTAL TORQUE DUE TO CYLINDER | C COMBINED TOTAL TORQUE |
|---|---|---|---|---|---|---|---|---|---|
| DEGREES | 1 | 2 | 3 | 4 | 5 | 6 | FORCES | PRESSURE | VALUES |
| 60 | 446/(7) | | | 5/13 | −181/125 | | 131 | 270 | 401 |
| 70 | 462/(24) | | | 0/13 | −140/69 | | 58 | 322 | 380 |
| 80 | 498/(63) | | 0/(5) | | −119/20 | | (48) | 379 | 331 |
| 90 | 477/(67) | | 0/(8) | | −111/(11) | | (86) | 366 | 280 |
| 100 | 446/(46) | | 0/(37) | | −82/0 | | (83) | 364 | 281 |
| 110 | 364/(51) | | 0/(53) | | −45/11 | | (93) | 319 | 226 |
| 120 | 224/51 | | 0/(48) | | 0/5 | | 10 | 224 | 234 |

Although any engine may be used in the present method, for illustrative purposes the engine used to calculate the values in Tables V and VI is assumed to be operating at a normal speed of 2000 RPM, and utilizing a normal piston/connecting rod assembly weighing two pounds. As a result, this piston/connecting rod assembly possesses 100 foot-pounds of potential inertial energy (kinetic energy) at approximately 90° after and 90° before its 0° top dead center position. Also, the assembly possesses zero foot-pounds of potential inertial energy at approximately 0° TDC and 180° BDC. The fluctuating torque due to the changes in inertial energy is also experienced by the crankpin assembly 104.

Table V represents in column form the calculation of these inertial forces for each 10° increment of the 360° cycle, including the change in the kinetic energy during the total displacement. For illustrative purposes the values of the offsets have been selected as follows: $CPO_{MIN}=1.2$; $CPO_{MAX}=2.8$; TO1=2.44 from 65° to 109° ATDC; TO2=2.70 from 240° to 312° ATDC. Using conventional relationships, the inertial force on the crankpin can be calculated for each increment. Using the known preset minimum, maximum, and transition crankpin offsets, the moment arm for each increment, as previously explained, can be calculated. The product of the calculated moment arm for each increment and the inertial force acting on the crankpin is the torque on the crankshaft at each increment due solely to the reciprocating type inertial effects of the piston/connecting rod assembly. These inertia induced crankshaft torque values are then transferred into the columns in Table VI for the appropriate cylinders and summed to generate the total torque induced by all six of the piston/connecting rod assemblies at each rotational increment (column A). Table VI also includes a column setting forth the total torque at each rotational increment due solely to gas pressure effects in the cylinders as determined in accordance with the method described hereinabove with respect to Tables III and IV (column B). The total gas pressure induced torque values (column B) are then summed with the total inertia induced torque values (column A) for each increment to obtain the combined total torque values (column C). The combined total torque values at each increment at normal operating speed are then compared to the torque values experienced at idle or low operating speeds wherein inertial effects on the output torque are insignificant. These combined torque values are also compared to the ideal mean torque value of 368. This comparison can be performed graphically as illustrated in FIG. 4. As can be seen, the gas pressure induced torque curve, for the present engine having a variable crankpin offset, indicates a more consistent torque output than the fixed crankpin offset arrangement of FIG. 2. This improvement in the torque output consistency will improve engine efficiency and reduce the fuel required per horsepower hour by an estimated 29%. However, this improved condition becomes less advantageous at higher operating speeds where the output torque deviates from the ideal mean torque in a significantly different way due to the non-linear effects of inertial forces, as indicated by the combined total torque curve. For example, the deviation from the ideal torque has most noticeably increased at approximately 30°–60°. With respect to possible ways of minimizing these deviations, particularly, when one of the combined total torque values and the gas pressure induced torque values is higher than the ideal mean torque and the other torque value is lower than the ideal mean torque at the same displacement point, i.e. at approximately 30° and 60° as shown in FIG. 4, with the torque values positioned on opposite sides of the ideal mean torque value line, then changing the crankpin offsets will not function to bring the output torque at both idle and high speeds closer to the ideal mean torque.

Figure 6A:
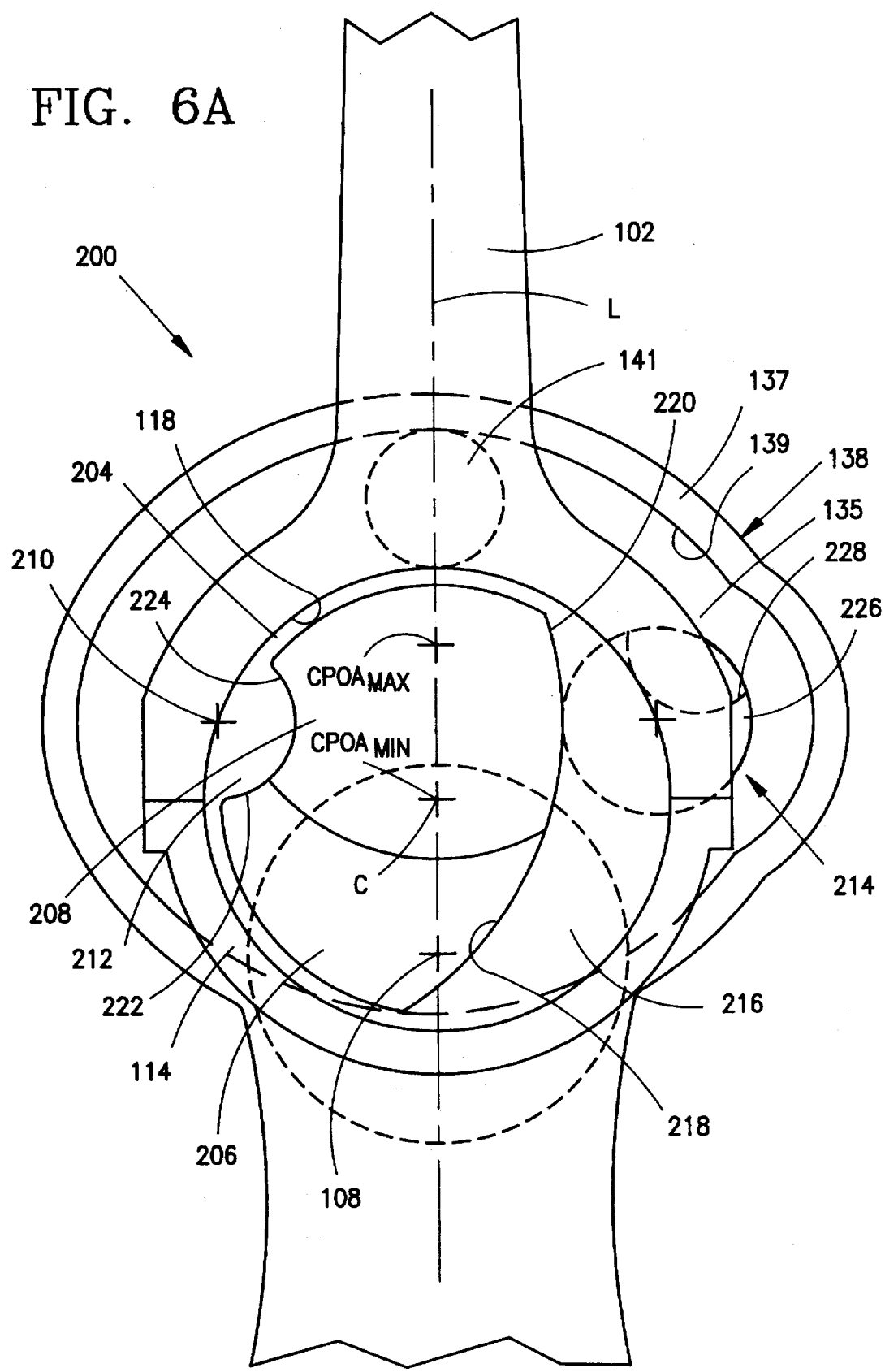
FIG. 6A is an end view of a second embodiment of the variable offset crankshaft/connecting rod connection of the present invention with the connecting rod in its outermost position with the engine piston at top dead center.
Figure 6B:
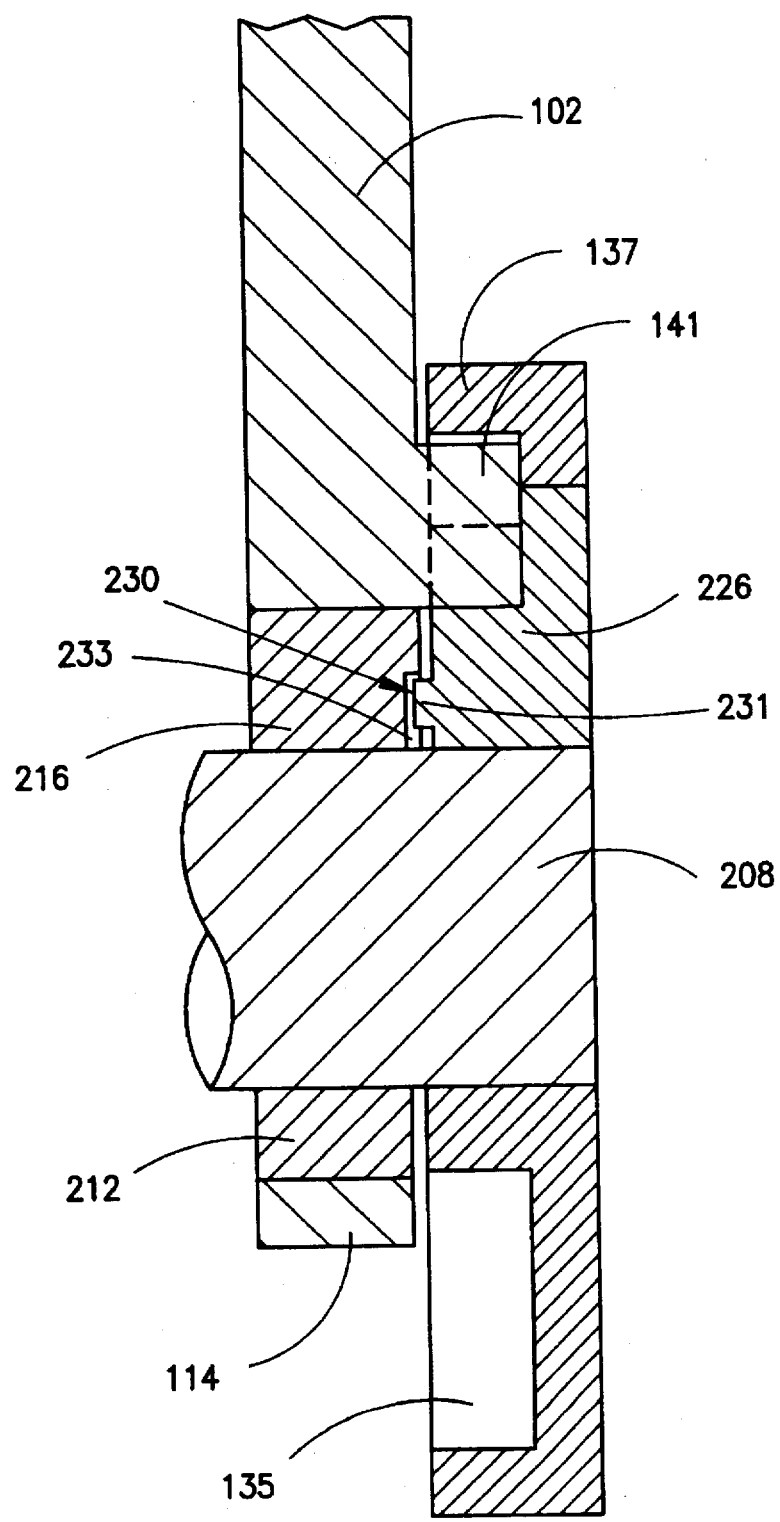
FIG. 6B is a partial sectional view of the variable offset crankshaft/connecting rod connection of the second embodiment of the present invention taken along line 6B—6B in FIG. 6G.

However, the deviation of the overall total torque curve may be decreased by altering the engine design to reduce the ratio of the inertial effects to the ideal mean torque. One way of decreasing the inertial effects is to increase the bore-to-stroke ratio. By increasing the bore and decreasing the stroke, the velocity, and therefore the kinetic energy, at each displacement increment, will be decreased thus reducing the inertial force of the piston/connecting rod assembly. For example, for the engine of the previous embodiment, if the stroke is decreased 20% and the bore area is correspondingly increased, i.e., 25%, in order to maintain the cubic inch displacement constant, and the torque value calculations previously described are repeated, a significant reduction in the inertial effects is achieved as illustrated in FIG. 5. FIG. 5 was generated by calculating the total inertial-induced torque and the total gas pressure induced torque values using the same procedure as described hereinabove with respect to Tables V and VI. As can be seen, by increasing the bore-to-stroke ratio and thus decreasing the inertial effects, the actual torque output at both high and low speeds more closely approximates the ideal mean torque. It is noteworthy that the mean torque per square inch of bore area of 281 closely approximates the 368 ideal mean torque per square inch of bore area when both are multiplied by their respective bore areas. The crankpin offsets may then be adjusted, using the above described method, to determine whether the deviation from the ideal mean torque can be further reduced. Of course, the calculating, estimating and comparing steps described hereinabove, required to achieve the optimum bore-to-stroke ratio and crankpin offsets, could be most easily accomplished via an appropriate computer algorithm. FIGS. 6A–6H illustrate another embodiment of the variable offset connection of the present invention, indicated generally at 200, which is similar to the embodiment of FIGS. 1A–1J in many respects, but includes a modified crankpin assembly 202. Referring to FIGS. 6A and 6B, the crankpin assembly has been modified to include a rotator bearing sleeve 204 having an aperture 206 formed therein for receiving a crankpin 208. Importantly, rotator bearing sleeve 204 includes an uninterrupted, continuous outer bearing surface 210 for sliding movement relative to connecting rod bearing surface 118. The uninterrupted, continuous outer bearing surface 210 is achieved by forming a rotator 212 integrally with sleeve 204 on one side, and providing a transition roller assembly 214 on the opposite side. Transition roller assembly 214, as described more fully hereinbelow, effectively permits the transition between the maximum crankpin offset ($CPO_{MAX}$) and the minimum crankpin offset ($CPO_{MIN}$) without the use of a rotator positioned in the same plane as integral rotator 212. Thus, transition roller assembly 214 is positioned in a plane adjacent to the plane in which bearing sleeve 204 is positioned to permit outer bearing surface 210 to extend in an uninterrupted manner around the entire circumference of connecting rod bearing surface 118. This design avoids unnecessary scoring and wearing of bearing surface 118, crankpin bearing surfaces 132, 134 and the outer surfaces 130 of rotators 122, 124 of the previous embodiment due to the practical difficulty in forming and positioning separate rotators and a crankpin so that their outer surfaces provide a smooth transition between the components at the interface of their bearing surfaces. As a result, the present embodiment significantly reduces the maintenance costs of the assembly in addition to the time and costs associated with manufacturing and positioning the components.

Figure 6C:
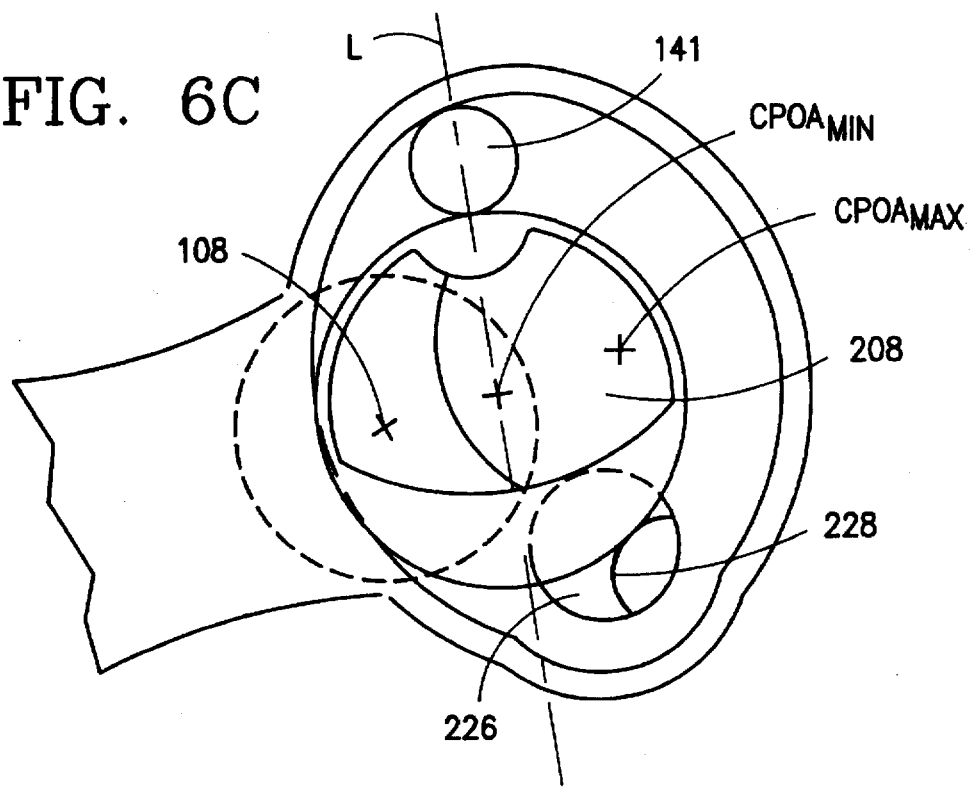
FIGS. 6C–6H are sequential end views of the variable offset crankshaft/connecting rod connection of the second embodiment of the present invention at various rotational displacement increments during one rotation of the crankshaft.
Figure 6D:
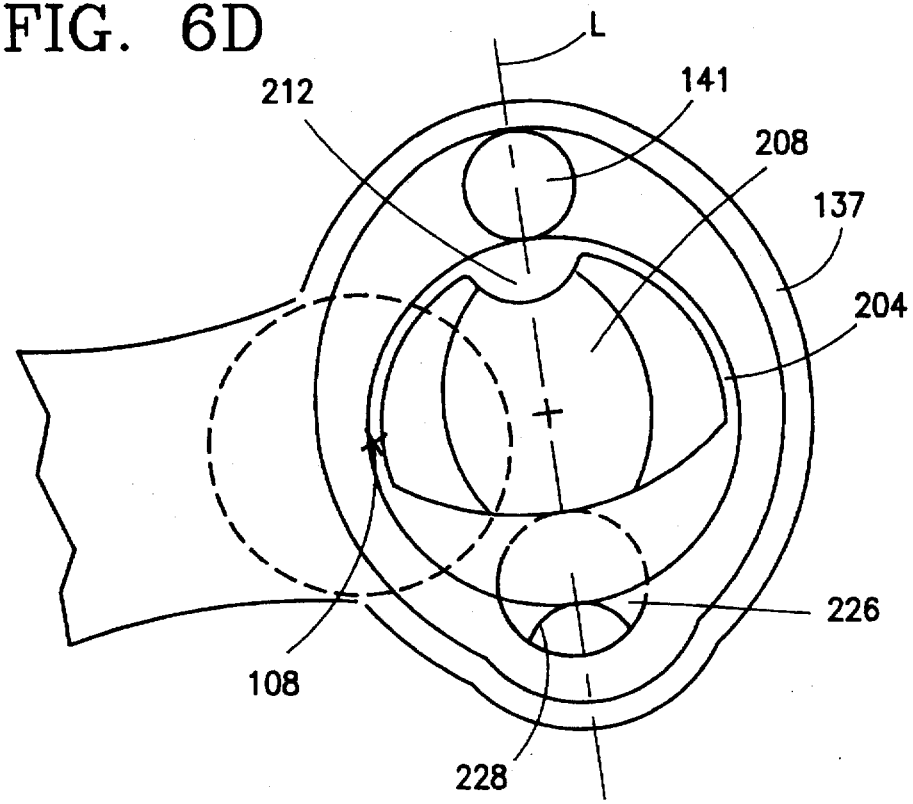
Figure 6E:
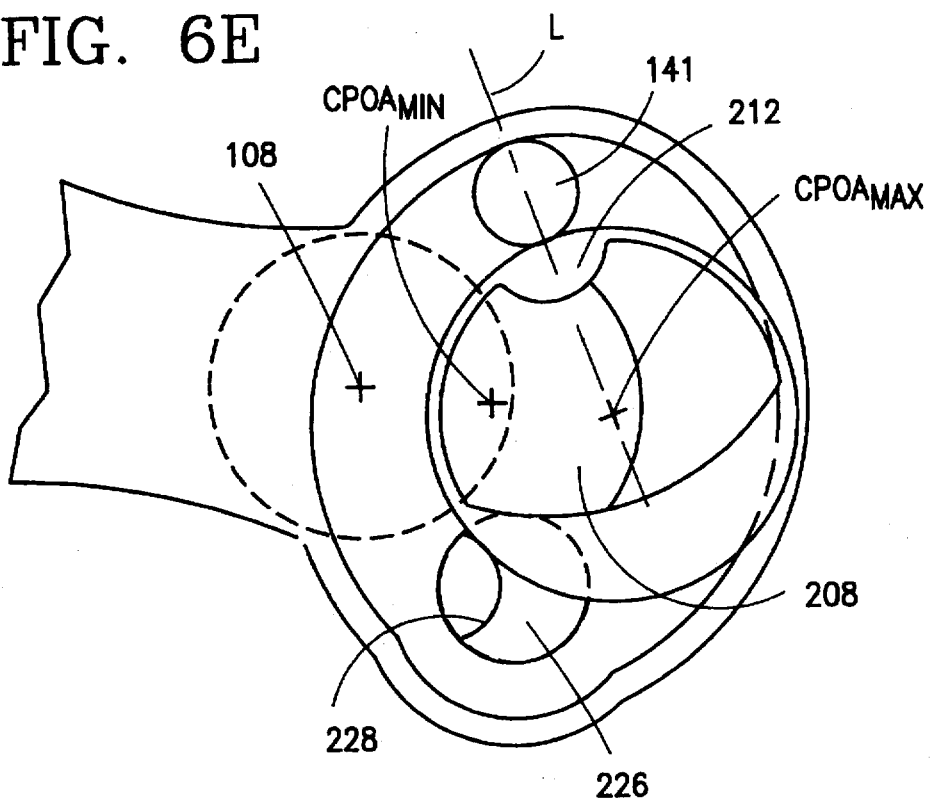

As shown in FIGS. 6A and 6B, rotator bearing sleeve 204 includes an inner support 216 forming a sleeve inner bearing surface 218 for slidably engaging a complementary shaped pivot surface 220 formed on crankpin 208. As with the first embodiment, integral rotator 212 includes an inner surface 222 slidably positioned in a concavity 224 formed in crankpin 208. When transitioning from the minimum crankpin offset to the maximum crankpin offset as illustrated in FIGS. 6C–6E, connecting rod 102 and rotator bearing sleeve 204 pivot around TOA1 causing inner surface 222 of rotator 212 to pivot relative to crankpin 208 while bearing surface 220 slides along sleeve inner bearing surface 218 until the maximum crankpin offset is reached as shown in FIG. 6E. Thus, although rotator 212 is formed integrally with bearing sleeve 204, the transition from minimum to maximum crankpin offsets is essentially the same as in the previous embodiment of FIGS. 1A–1J, including the alignment of TOA1 with the connecting rod center line to initiate the transition toward the maximum crankpin offset. Also, the determination of the position of TOA1 and the determination of the positions of $CPOA_{MIN}$ and $CPOA_{MIN}$ are the same as in the previous embodiment.

Transition roller assembly 214 includes a transition roller 226 pivotally mounted on the transverse support 138. Transition roller 226 includes a concavity 228 shaped to receive guide pin 141 which extends from connecting rod 102 into guide groove 135. Transition roller 226 engages a portion of bearing sleeve 204 via an indexing mechanism 230, e.g., a gear arrangement, formed between bearing sleeve 204 and transition roller 226, which causes transition roller 226 to be rotatably indexed during the transition periods as connecting rod 102 and bearing sleeve 204 pivot relative to one another. Indexing mechanism 230 includes gear pin 231 formed on transition roller 226 and gear recesses 233 formed in an adjacent surface of rotator bearing sleeve 204 for engagement by gear pin 231.

Figure 6F:
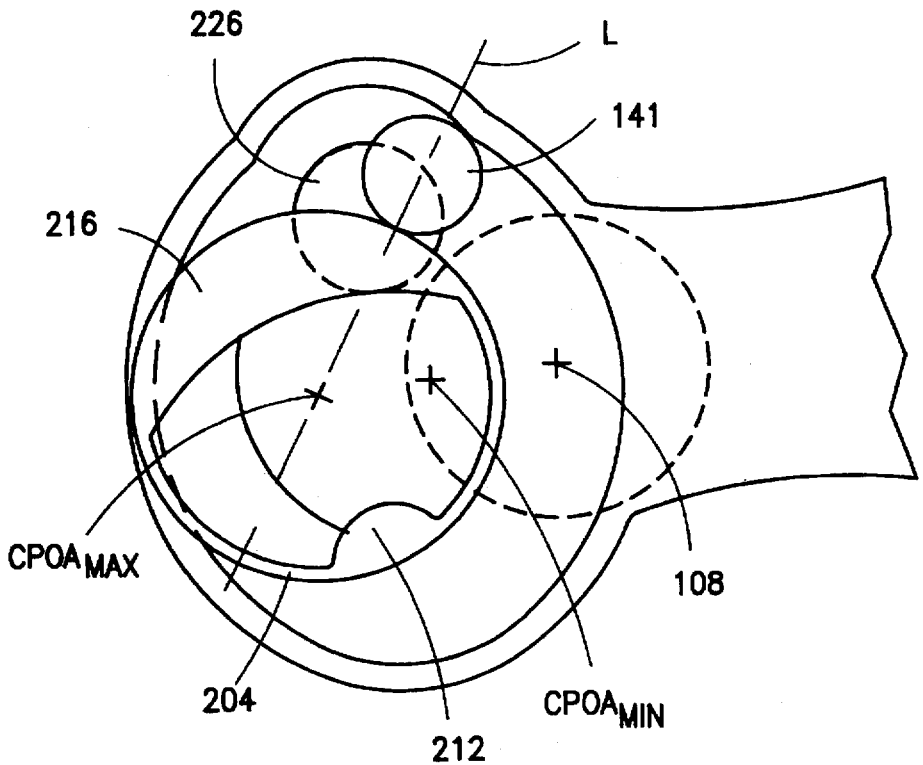
Figure 6G:
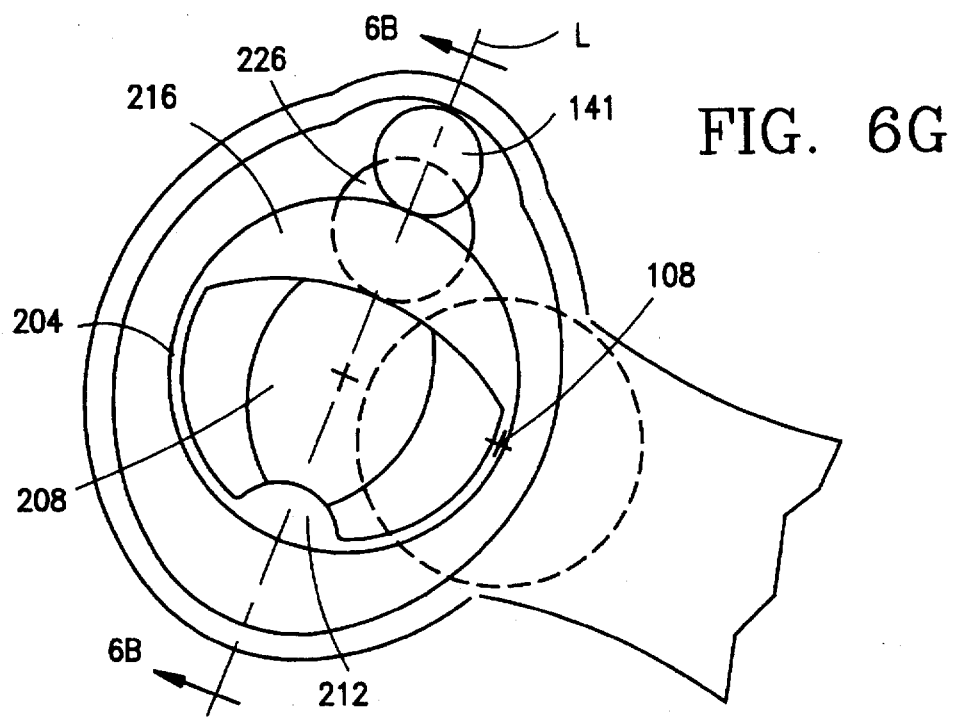
Figure 6H:
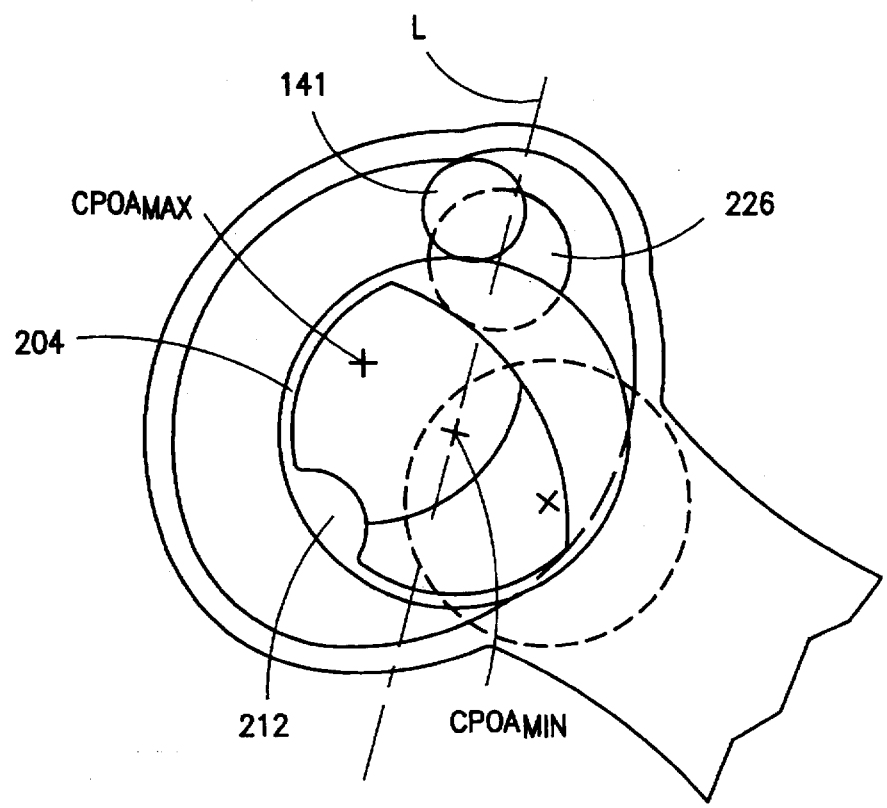
Figure 6I:
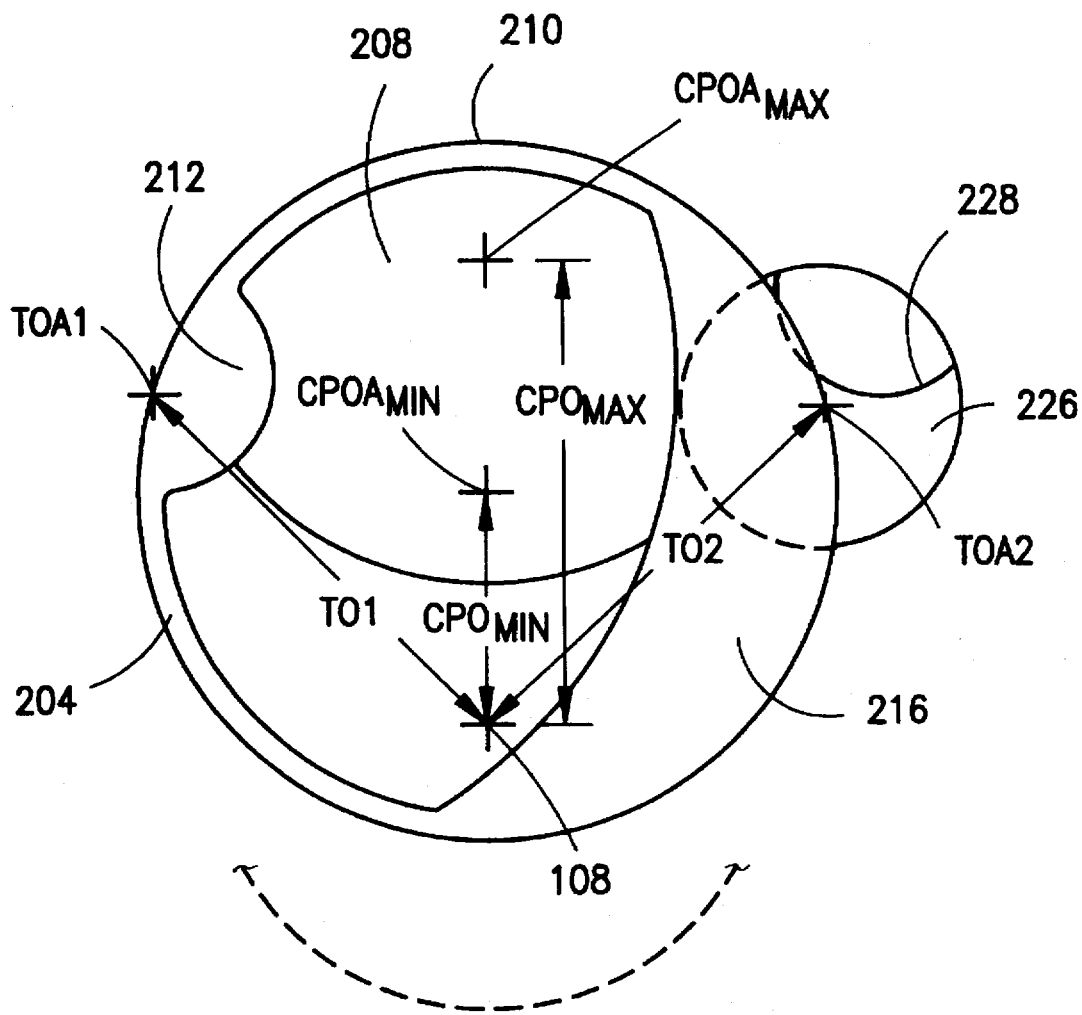
FIG. 6I is a schematic view of the crankpin assembly of the second embodiment of the present invention showing the various variable offsets.

In FIG. 6A, the connecting rod 102 is shown in its outermost position with the engine piston at its TDC position. The movement of the variable offset connection 200 from the position shown in FIG. 6A through the end of the increasing transition period is the same as that described with reference to the first embodiment of FIGS. 1A–1F, except that transition roller 214 is rotated by indexing mechanism 230 during the transition periods so as to position concavity 228 into a receiving position as shown in FIG. 6E. Referring to FIG. 6F, at some point during the rotation from bottom dead center to top dead center, guide pin 141 will move through guide groove 135 into engagement with concavity 228 of transition roller 226. As the crankshaft continues to rotate, transition roller 226 rotates to permit guide pin 141 to continue to move through guide groove 135 as connecting rod 102 and bearing sleeve 204 shift inwardly toward crankshaft 106 thus moving the crankpin offset from $CPO_{MAX}$ $CPO_{MIN}$. Referring to FIG. 6I, in this embodiment the circumferential and radial position of TOA1 and the corresponding crankpin offset may be determined as in the previous embodiment. Likewise, the circumferential position of TOA2 and the corresponding crankpin offset TO2 may be determined by initially choosing a desired angle for the beginning of the decreasing transition period from $CPOA_{MAX}$ to $CPOA_{MIN}$ during the compression stroke, e.g., 240° ATDC. The radial position of TOA2 along connecting rod centerline L can be determined by initially choosing a distance equal to 96% of $CPO_{MAX}$. The product of this percentage and the maximum offset value equals the radial distance between TOA2, located at the center of rotation of transition roller 226, and the crankshaft axis 108 along connecting rod centerline L, e.g., 2.70 in the illustrative example presented herein. The selection of the radial position of TOA2 controls the duration of the transition period, e.g., from 240°–310° ATDC.

Thus, it can be seen that integral rotator 212 pivoting in concavity 224 and transition roller assembly 214 perform substantially the same functions as were performed by first and second transition rockers 122 and 124. Together, they effectively permit smooth transitional movement of connecting rod 102 relative to crankpin 208 and its rotator bearing sleeve 204 during each transition between $CPO_{MIN}$ and $CPO_{MAX}$ over a range of angular rotation while effectively transmitting forces between connecting rod 102 and its crankpin 208. As a result, the moment arm can be optimally varied, as in the FIGS. 1A–1J embodiment, resulting in an output torque from the engine, during each increment of rotation, which more closely approximates an optimum constant torque. Moreover, the embodiment of FIGS. 6A–6H accomplishes this objective while avoiding the practical problem of transitioning between multiple bearing surfaces and the attendant disadvantage of scoring and wearing the connector rod bearing surfaces.

I claim:

1. A mechanism for translating reciprocating motion to rotary motion on a cyclic basis in combination with an internal combustion engine comprising:

at least one cylinder in said internal combustion engine, a reciprocating piston slidably provided within each said cylinder of said internal combustion engine;

synchronous control means which supplies a combustible mixture to each said cylinder and ignites the mixture for producing a combustion force causing the piston in said cylinder to move in one direction of its reciprocating motion to provide a power stroke for said cylinder; and an engine output shaft rotatably mounted with said internal combustion engine, connection means for operatively connecting said engine output shaft to each said reciprocating piston for translating the reciprocating motion of each said piston to rotary motion of said shaft through a variable moment arm between the axis of rotation of said engine output shaft and the point of operative connection between each said piston and said shaft for providing a substantially constant engine torque output throughout each increment of rotation of the engine output shaft, taking into consideration the torque contributions and demands of all cylinders, said connection means including crankpin means for each piston, said crankpin means being fixed to rotate with the engine output shaft and defining a plurality of fixed crankpin offsets which sequentially vary the moment arm in a predetermined manner during the rotation of the engine output shaft to produce a substantially constant engine torque output during each increment of rotational movement of said engine output shaft.

2. The mechanism of claim 1, wherein said plurality of fixed crankpin offsets includes a minimum fixed crankpin offset and a maximum fixed crankpin offset, each of said minimum and said maximum fixed crankpin offsets being maintained during a respective range of degrees of rotation of said engine output shaft.

3. The mechanism of claim 2, wherein said piston reciprocates through power and compression strokes, said minimum and said maximum fixed crankpin offsets each being maintained during a respective portion of each of the piston power and compression strokes.

4. The mechanism of claim 3, wherein said piston reciprocates between top dead center and bottom dead center positions, said minimum fixed crankpin offset being maintained as said piston moves through said top dead center position, and said maximum fixed crankpin offset being maintained as said piston moves through said bottom dead center position.

5. The mechanism of claim 3, wherein said crankpin means further includes a transition means for transitioning between said minimum and said maximum fixed crankpin offsets.

6. The mechanism of claim 5, wherein said transition means defines a first transition offset for varying the moment arm for at least a portion of an increasing transition period measured in rotational degrees during which the crankpin offset shifts from said minimum fixed crankpin offset to said maximum fixed crankpin offset, and a second transition offset for varying the moment arm for at least a portion of a decreasing transition period measured in rotational degrees during which the crankpin offset shifts from said maximum fixed crankpin offset to said minimum fixed crankpin offset.

7. The mechanism of claim 6, wherein said increasing transition period occurs entirely during the power stroke of the piston and said decreasing transition period occurs entirely during the compression stroke of the piston.

8. The mechanism of claim 1, wherein said connection means comprises an elongate connecting rod for each piston, each said connecting rod being connected at one end to a piston and mounted at an opposite end for abutting sliding movement on said crankpin means, each said connecting rod having a bearing surface, each said crankpin means including a crankpin having a plurality of bearing surfaces for sequential sliding abutment with the connecting rod bearing surface as said engine output shaft rotates, each bearing surface of said crankpin being associated with a fixed offset for varying the moment arm when the connecting rod bearing surface is in abutment with said bearing surface, the effective crankpin offset sequentially shifting among the plurality of fixed crankpin offsets as the engine output shaft rotates to achieve a substantially constant output torque at each increment of output shaft rotation.

9. The mechanism of claim 8, wherein said crankpin defines at least two fixed crankpin offsets, the bearing surface associated with at least one of said offsets having a radius of curvature, the fixed offset apex for each said bearing surface being positioned at the center of curvature for each said surface.

10. The mechanism of claim 8, wherein said crankpin includes first and second bearing surfaces defining first and second fixed crankpin offsets, respectively, said first and said second bearing surfaces each having a respective radius of curvature with a respective center of curvature, said first and said second fixed crankpin offsets defined by the respective distance between the respective center of curvature of the respective bearing surface and the axis of rotation of said engine output shaft.

11. The mechanism of claim 10, wherein said crankpin means further includes a transition means for transitioning between said first and said second fixed crankpin offsets.

12. The mechanism of claim 11, wherein said transition means includes a first transition bearing surface for transitioning from said first fixed crankpin offset to said second fixed crankpin offset, and a second transition bearing surface for transitioning from said second fixed crankpin offset to said first fixed crankpin offset.

13. The mechanism of claim 11, wherein said transition means includes a rocker means for permitting the connecting rod to undergo unobstructed sliding movement during transitions between said first and second bearing surfaces.

14. The mechanism of claim 13, wherein said rocker means includes a first rocker having an outer bearing surface for sliding abutment with the connecting rod bearing surface and an arcuate inner surface adapted for pivotal rocking movement relative to said crankpin in a complementary shaped concavity formed in said crankpin, and further including a first transition offset associated with said first rocker for varying the moment arm for at least a portion of an increasing transition period measured in rotational degrees during which the crankpin offset shifts from said first fixed crankpin offset to said second fixed crankpin offset.

15. The mechanism of claim 14, wherein said arcuate inner surface has a radius of curvature with a center of curvature, said first transition offset defined by the distance between said center of curvature and the axis of rotation of said engine output shaft.

16. The mechanism of claim 14, wherein said rocker means further includes a second rocker having an outer bearing surface for sliding abutment with the connecting rod bearing surface and an arcuate inner surface adapted for pivotal rocking movement relative to said crankpin in a complementary shaped concavity formed in said crankpin, and further including a second transition offset associated with said second rocker for varying the moment arm for at least a portion of a decreasing transition period measured in rotational degrees during which the crankpin offset shifts from said second fixed crankpin offset to said first fixed crankpin offset.

17. The mechanism of claim 16, wherein said arcuate inner surface of said first rocker includes a radius of curvature with a first center of curvature, said first transition offset defined by the distance between said first center of curvature and the axis of rotation of said engine output shaft, said arcuate inner surface of said second rocker including a radius of curvature with a second center of curvature, said second transition offset defined by the distance between said second center of curvature and the axis of rotation of said engine output shaft, wherein the connecting rod, with said first and second rockers, pivots about said first and said second centers of curvature, respectively, during said increasing and said decreasing transition periods, respectively.

18. The mechanism of claim 14, further including a rotator bearing sleeve positioned around said crankpin and including a continuous outer surface for sliding abutment with said connecting rod bearing surface, said first rocker being formed integrally with said rotator bearing sleeve such that said continuous outer surface includes said outer bearing surface of said first rocker.

19. The mechanism of claim 18, further including a transverse support mounted on said engine output shaft adjacent said crankpin means for rotational movement with said crankpin means, said connecting rod including a guide pin positioned adjacent said transverse support during rotation of said engine output shaft, said transition means further including a transition roller pivotally mounted in a fixed position on said transverse support relative to said crankpin, said transverse roller including a concavity for engaging said guide pin during rotation of said crankpin means, wherein said concavity of said transition roller engages said guide pin during a decreasing transition period measured in rotational degrees to permit shifting of the crankpin offset from said second fixed crankpin offset to said first fixed crankpin offset.

20. The mechanism of claim 19, further including an indexing mechanism for pivoting said transition roller into a receiving position for engaging said guide pin prior to each decreasing transition period.

21. The mechanism of claim 20, wherein said indexing mechanism is formed on said rotator bearing sleeve.

22. The mechanism of claim 2, wherein said crankpin means comprises a crankpin, first and second opposite crankpin bearing surfaces on the crankpin for sliding abutment with the connecting rod bearing surface, first and second rocker means positioned on opposite sides of the crankpin between said first and second bearing surfaces and said second and first bearing surfaces, respectively, each said rocker means having an outer transition bearing surface for sliding abutment with the connecting rod bearing surface and an arcuate inner surface adapted for pivotal rocking movement relative to said crankpin in a complementary shaped concavity formed in said crankpin, the first and second crankpin bearing surfaces, the outer transition bearing surfaces of said rocker means and the connecting rod bearing surface being arcuate and having equal radii of curvature to permit unobstructed sliding movement between the connecting rod bearing surface and the crankpin and transition bearing surfaces as the engine output shaft rotates.

23. A method of making an engine output shaft for use in an internal combustion engine in combination with at least one engine cylinder and a reciprocating piston slidably provided within each cylinder for converting reciprocating motion into rotary motion while providing a substantially constant level of torque from said engine output shaft at each increment of output shaft rotation taking into account the torque contributions and demands of all the cylinders, comprising the steps of:

(a) providing an engine output shaft including crankpin means for each piston, said crankpin means being fixed to rotate with the shaft and defining a plurality of fixed crankpin offsets which sequentially vary the moment arm between the axis of rotation of said engine output shaft and the point of operative connection between each said piston and said shaft in a predetermined manner during the rotation of the engine output shaft to produce a substantially constant total torque output during each increment of rotational movement of said engine output shaft;

(b) determining a target value of total torque output for each increment of engine output shaft rotation;

(c) selecting first estimated values of each of said plurality of fixed crankpin offsets;

(d) calculating the moment arms and engine output shaft torque for each rotational increment using the selected offsets for a single cylinder during at least its power and compression strokes;

(e) summing the torque contributions and torque demands for all cylinders at each increment of engine output shaft rotation to determine the total torque output for each increment;

(f) comparing the total torque output for each increment with the target value of total torque output for each increment;

(g) selecting second estimated values of each of said plurality of fixed crankpin offsets based upon the observed deviations from the target torque value; and, (h) repeating the calculations of steps (b) through (g) until the selected offsets satisfactorily reproduce the target torque value.

24. A method as in claim 23 wherein said crankpin means further defines a plurality of transition offsets for varying the moment arm during a plurality of transition periods during which the effective crankpin offset shifts between said plurality of crankpin offsets and said selecting steps include selecting estimated values of each of said plurality of transition offsets.

25. A method as in claim 24 wherein each transition offset has a transition offset apex and the position of said apex is defined by a radial location measured as the distance of said apex from the axis of rotation of the engine output shaft indicative of the duration of the transition period and a circumferential location measured in rotational degrees indicative of the beginning of the transition period and said selecting steps include selecting estimated values for the radial and circumferential locations of the apex for each transition offset.

26. A method as in claim 25 wherein the step of calculating the engine output shaft torque for each rotational increments includes calculating the inertia induced torque values for a single cylinder and the step of summing the torque contributions and demands to determine the total torque output for each increment includes summing the inertia induced torque contributions and demands with the cylinder pressure torque contributions and demands.

27. A method as claimed in claim 26 wherein the engine cylinder has a bore and the reciprocating piston has a stroke and including the steps of selecting, prior to calculating the moment arms and engine output shaft torque for each rotational increment, a first value for the bore to stroke ratio and, selecting, after comparing the total torque output with the target value of total torque for each increment, an adjusted value for the bore to stroke ratio, whereby increasing the bore to stroke ratio decreases the effects of the inertia induced torque contributions and demands on the total torque output for each increment.

28. A method as claimed in claim 23 wherein said crankpin defines first and second fixed crankpin offsets, a first transition offset for varying the moment arm for at least a portion of an increasing transition period during which the crankpin offset shifts from said first fixed crankpin offset to said second fixed crankpin offset and a second transition offset for varying the moment arm for at least a portion of a decreasing transition period during which the crankpin offset shifts from said second fixed crankpin offset to said first fixed crankpin offset.

29. A variable offset connection for an internal combustion engine of the type including at least one piston reciprocably mounted within a cylinder bore and a crankshaft mounted for rotation around a longitudinal axis to thereby transmit an output torque, comprising:

a connecting rod including a first end connected to the piston and a second end positioned a spaced distance from said first end;

a non-circular crankpin assembly, as viewed in a plane perpendicular to the longitudinal axis of the crankshaft, mounted on the crankshaft, said second end of said connecting rod pivotally connected to said crankpin assembly, said crankpin assembly including a first bearing surface having a first radius of curvature positioned for abutment by said second end of said connecting rod to define a first crankpin offset distance between the center of said first radius of curvature and the longitudinal axis of the crankshaft, said crankpin assembly further including a second bearing surface having a second radius of curvature positioned for abutment by said second end of said connecting rod to define a second crankpin offset distance between the center of said second radius of curvature and the longitudinal axis of the crankshaft.

30. A variable offset connection for an internal combustion engine of the type including at least one piston reciprocably mounted within a cylinder bore and a crankshaft mounted for rotation around a longitudinal axis to thereby transmit an output torque, comprising:

a connecting rod including a first end connected to the piston and a second end positioned a spaced distance from said first end;

a crankpin assembly mounted on the crankshaft, said second end of said connecting rod pivotally connected to said crankpin assembly, said crankpin assembly including a first bearing surface having a first radius of curvature positioned for abutment by said second end of said connecting rod to define a first crankpin offset distance between the center of said first radius of curvature and the longitudinal axis of the crankshaft, said crankpin assembly further including a second bearing surface having a second radius of curvature positioned for abutment by said second end of said connecting rod to define a second crankpin offset distance between the center of said second radius of curvature and the longitudinal axis of the crankshaft, wherein said first radius of curvature and said second radius of curvature are unequal.

31. A variable offset connection for an internal combustion engine of the type including at least one piston reciprocably mounted within a cylinder bore and a crankshaft mounted for rotation around a longitudinal axis to thereby transmit an output torque, comprising:

a connecting rod including a first end connected to the piston and a second end positioned a spaced distance from said first end;

a crankpin assembly mounted on the crankshaft, said second end of said connecting rod pivotally connected to said crankpin assembly, said crankpin assembly including a first bearing surface having a first radius of curvature positioned for abutment by said second end of said connecting rod to define a first crankpin offset distance between the center of said first radius of curvature and the longitudinal axis of the crankshaft, said crankpin assembly further including a second bearing surface having a second radius of curvature positioned for abutment by said second end of said connecting rod to define a second crankpin offset distance between the center of said second radius of curvature and the longitudinal axis of the crankshaft, wherein said first crankpin offset distance and said second crankpin offset distance are unequal.

* * * * *